United States Patent
Yamauchi et al.

(10) Patent No.: US 9,945,645 B2
(45) Date of Patent: Apr. 17, 2018

(54) IGNITER ASSEMBLY, AIRBAG SYSTEM, AND DETECTION SYSTEM AND DETECTION METHOD FOR SAME

(71) Applicants: Hitachi Systems, Ltd., Tokyo (JP); Daicel Corporation, Osaka-shi, Osaka (JP)

(72) Inventors: Shigeru Yamauchi, Tokyo (JP); Takaaki Yui, Tokyo (JP); Kenichiro Tomoi, Tokyo (JP); Toshiyuki Sakai, Tatsuno (JP); Shingo Oda, Tatsuno (JP)

(73) Assignees: HITACHI SYSTEMS, LTD., Tokyo (JP); DAICEL CORPORATION, Osaka (JP)

( * ) Notice: Subject to any disclaimer, the term of this patent is extended or adjusted under 35 U.S.C. 154(b) by 0 days.

(21) Appl. No.: 14/917,584

(22) PCT Filed: Sep. 10, 2013

(86) PCT No.: PCT/JP2013/074370
§ 371 (c)(1),
(2) Date: Mar. 9, 2016

(87) PCT Pub. No.: WO2015/037051
PCT Pub. Date: Mar. 19, 2015

(65) Prior Publication Data
US 2016/0223301 A1     Aug. 4, 2016

(51) Int. Cl.
*B60R 21/264*     (2006.01)
*F42B 3/12*     (2006.01)
*B60R 21/00*     (2006.01)
*B60R 21/26*     (2011.01)

(52) U.S. Cl.
CPC .......... *F42B 3/121* (2013.01); *B60R 21/264* (2013.01); *B60R 2021/003* (2013.01); *B60R 2021/26029* (2013.01); *B60R 2021/26076* (2013.01)

(58) Field of Classification Search
CPC ... F42B 3/121; B60R 21/2644; B60R 21/264; B60R 21/26; B60R 2021/26029
USPC ................................ 280/741; 102/530, 531
See application file for complete search history.

(56) References Cited

FOREIGN PATENT DOCUMENTS

| | | |
|---|---|---|
| JP | 02-000595 A | 1/1990 |
| JP | 2006-125650 A | 5/2006 |
| JP | 2006-282091 A | 10/2006 |
| JP | 2008-013031 A | 1/2008 |

(Continued)

OTHER PUBLICATIONS

International Search Report of PCT/JP2013/074370 dated Dec. 17, 2013.

*Primary Examiner* — Keith J Frisby
(74) *Attorney, Agent, or Firm* — Mattingly & Malur, PC

(57) ABSTRACT

An igniter assembly for which an igniter and a conductive igniter collar are integrated via an insulating layer, wherein the igniter comprises a metal eyelet, a metal cover that retains the eyelet therein, an ignition charge that is disposed in the cover and in a space in contact with an end face of the eyelet, a heating body that is connected to the end face of the eyelet, and a conductive pin that passes through the insulating layer and is electrically connected to the heating body. The other end of the conductive pin is exposed from the insulating layer so that a current supplying circuit is connected. An IC tag is disposed in the insulating layer and near the conductive pin. The IC tag has an IC chip and a coil antenna that is wound around the IC chip.

15 Claims, 15 Drawing Sheets

(56) References Cited

FOREIGN PATENT DOCUMENTS

| | | |
|---|---|---|
| JP | 2008-090813 A | 4/2008 |
| JP | 2009-272768 A | 11/2009 |

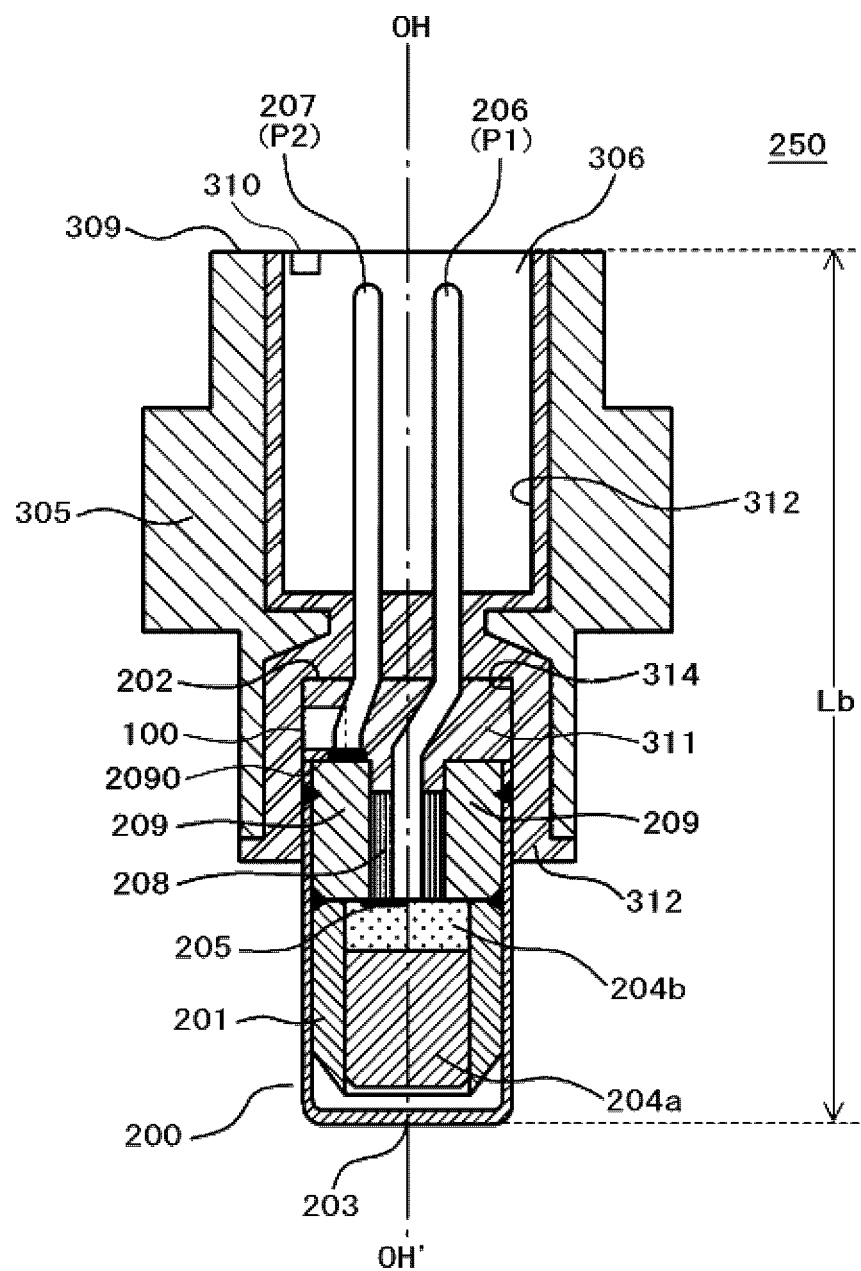
F I G. 1 A

F I G. 2 B
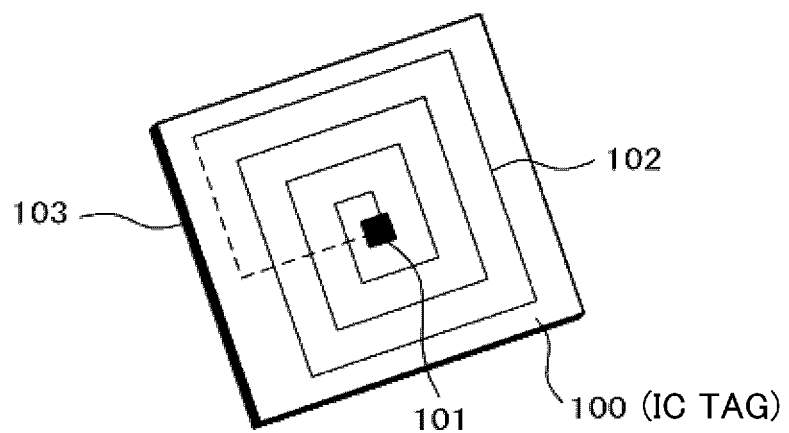

F I G. 3
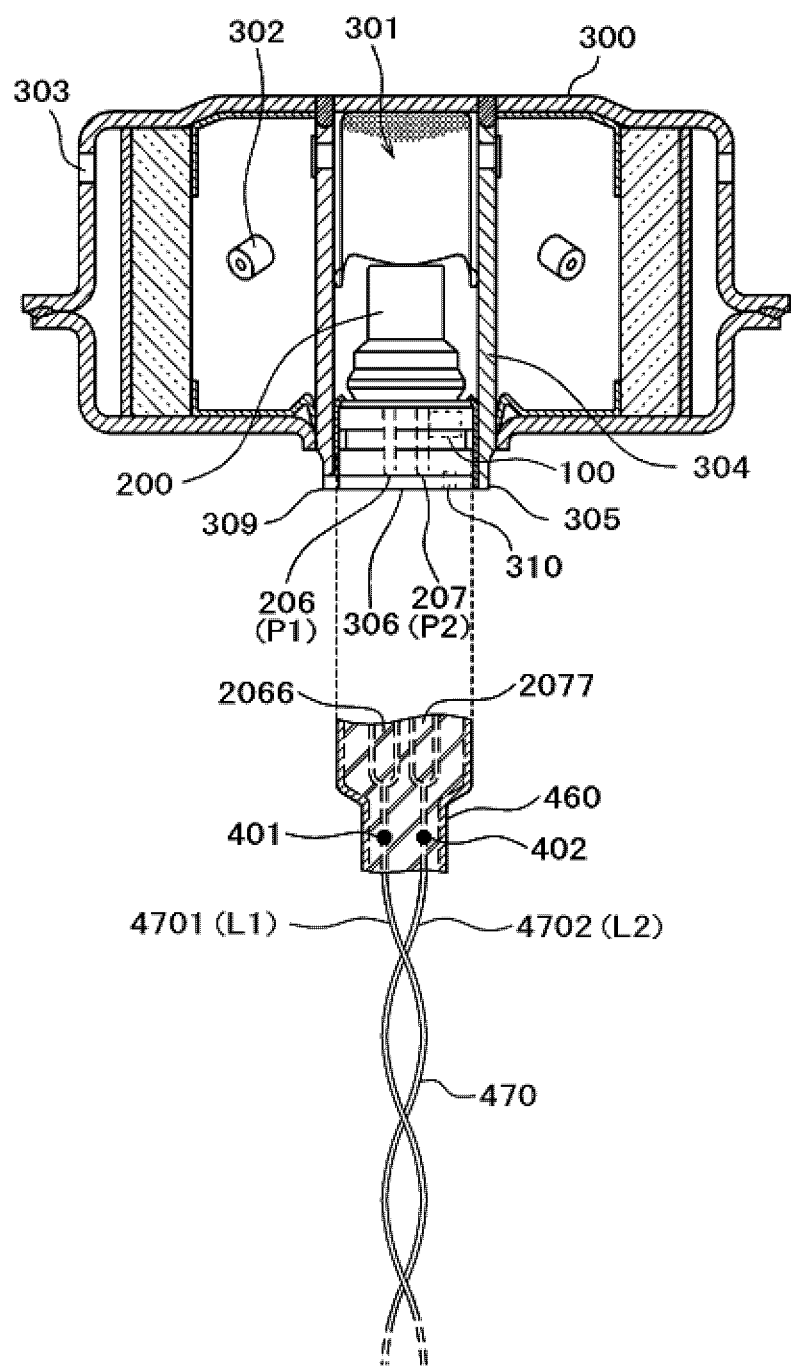

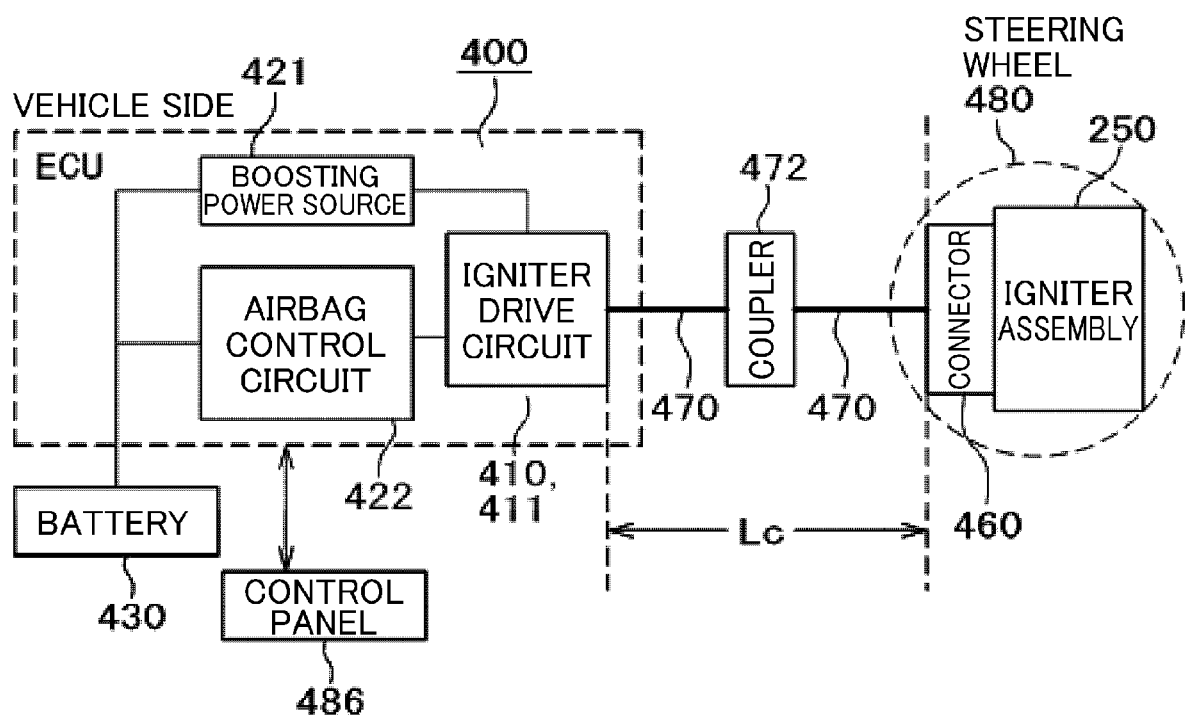
F I G. 5 B

F I G. 6
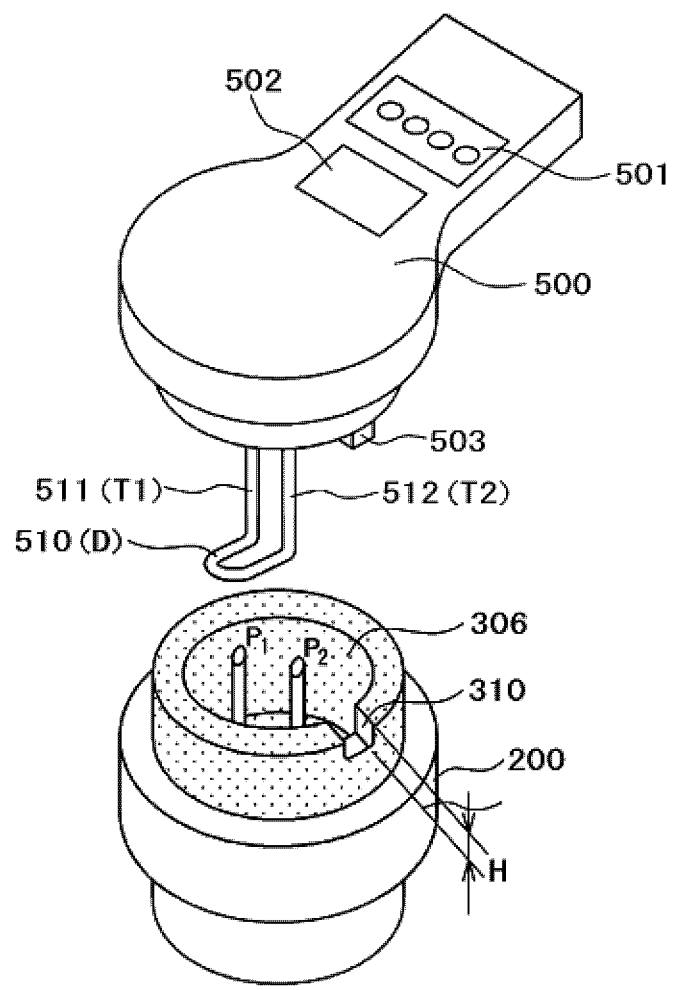

F I G. 7
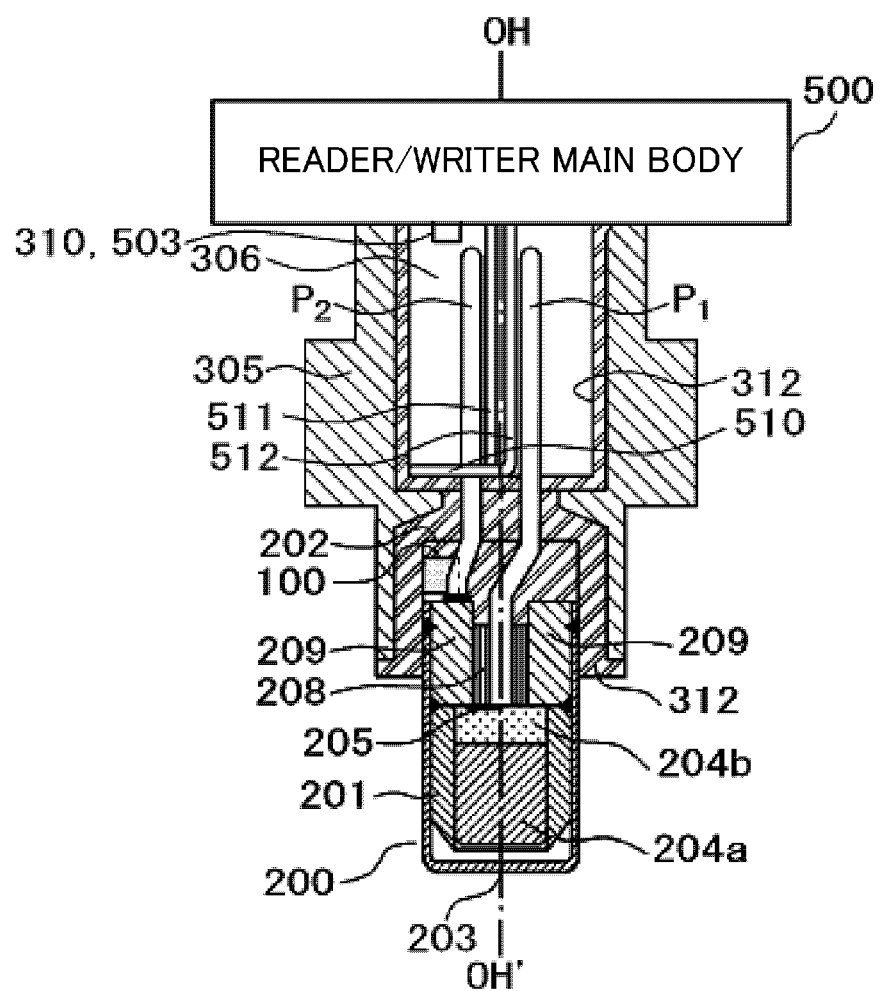

IGNITER ASSEMBLY, AIRBAG SYSTEM, AND DETECTION SYSTEM AND DETECTION METHOD FOR SAME

TECHNICAL FIELD

The present invention relates to an igniter assembly, an airbag system, and a detection system therefor, and more in particular to an IC tag incorporated igniter assembly used for a device utilizing electrical ignition and an automotive airbag system using the igniter assembly.

BACKGROUND ART

An automotive airbag system is equipped with an electric igniter or an igniter assembly (initiator, hereinafter simply referred to as an igniter assembly unless there is a particular need to make distinction) as a gas generator (inflator) for instantaneously inflating an airbag to protect a driver or passenger during a crash. This igniter assembly is formed by integrally molding the igniter with a resin, followed by crimping a metal collar on the resultant mold, or by integrally resin-molding the igniter and the metal collar. Both of these igniter assemblies have a structure in which a heating element for ignition is contained therein and a conductive pin connected to the heating element extends to the outside.

Patent Literature 1 discloses an ignition tool with a wireless IC tag disposed outside or inside an igniter collar (a metal cylindrical body) and in the vicinity of a core wire. The ignition tool is configured such that the wireless IC tag and the core wire are arranged adjacent to each other, thereby causing the core wire or metal cylindrical body to serve as a monopole antenna for the wireless IC tag.

Furthermore, Patent Literature 2 discloses an ignition device for an airbag device, which has connectors connected to a plurality of discrete squibs so that the squibs can be individually energized, each of the connectors having an IC chip installed therein. Each of the IC chips stores an ID for a distinction between one connector and another. Each of the connectors actuates the squib connected thereto if the ID included in a reference signal input thereto matches its own ID.

Further, Patent Literature 3 discloses an RFID tag reader/writer device which includes a minute loop so as to communicate with a small metal RFID tag.

Patent Literature 4 discloses a device in which a memory package is disposed to face a front end provided on the reader/writer side, thereby performing the mutual transmission of information by electromagnetic induction coupling between the front end and the memory package, wherein a protrusion or recess for positioning is formed on one of the facing surfaces of the memory package and the front end.

Patent Literature 5 discloses a tire information reading device which reads the information from a RFID tag using a sensor unit provided to a vehicle. The tire attached with the RFID tag is provided with a marker (positioning means) for the positioning with respect to a valve, which is disposed in the vicinity of the position where the RFID tag is attached.

Patent Literature 6 discloses a wireless tag mounted inside a hollow conductive pipe, which includes: a contact that is electrically connected with the conductive pipe; a lead wire that is disposed along the longitudinal direction within the conductive pipe so as to form a coaxial line together with the conductive pipe; and a wireless tag circuit with one end electrically connected to the contact and the other end electrically connected to the lead wire.

CITATION LIST

Patent Literature

Patent Literature 1: Japanese Patent Application Publication No. 2006-125650
Patent Literature 2: Japanese Patent Application Publication No. 2008-013031
Patent Literature 3: Japanese Patent Application Publication No. 2008-90813
Patent Literature 4: Japanese Patent Application Publication No. Hei 2-595
Patent Literature 5: Japanese Patent Application Publication No. 2006-282091
Patent Literature 6: Japanese Patent Application Publication No. 2009-272768

SUMMARY OF INVENTION

Technical Problem to be Solved by the Invention

To reliably protect a driver or passenger using an airbag in time of emergency requires the ignition device to be correctly assembled and fabricated.

Further, it is desirable to protect electronic components, including the ignition device, with a metallic shield from the standpoint of safety.

In the management of products or parts, it has been a conventional practice to affix barcodes to the products or parts or to directly imprint numbers on the products or parts. In those cases, the products or parts need to have space to affix the barcode or need to be large enough to allow visually recognizable imprints. However, an igniter assembly for use in automotive airbag systems is small in size. For example, such igniter assembly has an axial length of 2 cm and a maximum diameter of about 2 cm. In this manner, the igniter assembly is too small in size to allow for the affixture of the conventional barcode. Furthermore, even if manufacturing information is directly imprinted on the igniter assembly, the imprints are too small to be visually recognized. Further, the igniter assembly is resin-molded in the final stage, so that the imprints cannot be visually read or mechanically read from outside. Therefore, discrete management of the igniter by directly recording the manufacturing information thereon has not been provided. If a critical safety component such as an air bag fails, the serial number and manufacturing record of the component are tracked to analyze the cause of failure and determine the range of failure. However, since the igniters are not under the discrete management as described above, there has been a problem that the range of failure is defined unduly wide or that it is difficult to implement measures for preventing a recurrence of the failure in the igniters because the cause of the failure cannot be identified.

The ignition tool of Patent Literature 1 is provided with the wireless IC tag disposed outside or inside the igniter collar and in the vicinity of the core wire. If the ignition tool with the wireless IC tag is disposed outside the igniter collar, the IC tag is not protected by the igniter collar. If the IC tag not protected by the igniter collar is applied to the initiator of an automotive airbag system, the electronic components of the IC tag cannot be protected from impact at the time of airbag deployment because the IC tag is merely covered with a resin. Because of no shield for protecting the electronic components, a major safety problem arises such that the IC tag, its surrounding components or circuits are destroyed or damaged by impact caused by the ignition reaction of igniter powder or the like after the actuation of the airbag system, possibly resulting in a chain reaction of damage. Furthermore, some trouble is caused in the case where the IC tag information of the initiator after ignition is to be used for the investigation of the cause of failure or the like.

On the other hand, if the ignition tool with the wireless IC tag is disposed inside the igniter collar, the communication with an IC tag communication reader/writer is difficult. That is, the ignition tool with the wireless IC tag of Patent Literature 1 is configured so that the metal cylindrical body serves as a monopole antenna for the wireless IC tag. In one specific example, if the overall length (axial length) of the metal cylindrical body for a detonator is 65 mm, high radio wave transmission efficiency to the IC tag in the metal cylindrical body is obtained by adopting a radio wave signal of 2.45 GHz as a measurement frequency by a network analyzer. However, in the invention of Patent Literature 1, the manufacturing information of the IC tag is obtained by causing the leg line or metal cylindrical body to serve as an antenna, such as a monopole antenna, and therefore the metal cylindrical body requires a predetermined length, such as ($\frac{1}{4}$)·$\lambda$ or ($\frac{1}{2}$)·$\lambda$, for the measurement frequency for use in the network analyzer.

In the case of using a radio wave in the UHF (ultra-high frequency) band commonly used as an IC tag communication reader/writer for airbag systems, if a radio wave signal of 2.45 GHz is adopted, ($\frac{1}{4}$)·$\lambda \approx 30$ mm, and if a radio wave signal of 920 MHz is adopted, ($\frac{1}{4}$)·$\lambda \approx 160$ mm. Therefore, in the case of the igniter assembly for airbag systems which has a short and thin metal cylindrical body (for example, a length of about 20 mm or less), it is impossible to adopt the invention of Patent Literature 1, and obtain the manufacturing information of the IC tag from the outside by causing the metal cylindrical body to serve as an antenna such as a monopole antenna, requiring a predetermined length.

Furthermore, the RFID tag (IC tag) of Patent Literature 2 is disposed outside a charging circuit connected to an integrated IC substrate, in other words, outside the squibs, and is not protected by the metallic shield of the squibs.

If the RFID tag of Patent Literature 2, which is not protected by the metallic shield, is applied to the initiator, the electronic components cannot be protected from impact at the time of airbag deployment.

In Patent Literature 3, there is no description that the RFID tag (IC tag) is incorporated in the igniter assembly in an airbag storage body.

The invention of Patent Literature 4 is based on the assumption that the memory package is disposed to face the front end provided on the reader/writer side, and therefore its applicability to the reading or writing of information from/to the IC tag incorporated in a small igniter assembly is difficult. More specifically, the recessed and protruding portions for positioning intended for the arrangement of two coils facing each other on the same plane are based on the assumption that the two coils and the recessed and protruding portions can be formed on the same plane. The interior of the igniter assembly such as an inflator has no space where the two coils are arranged facing each other, and it is necessary to arrange the two coils in upright relation at an angle of about 90° using a narrow clearance. Therefore, it is difficult to apply, to the narrow clearance, the mechanical fitting technology for the recessed and protruding portions for reliably arranging the two coils facing each other in the plane.

In the invention of Patent Literature 5, the marker is provided for the installation of the RFID tag at the valve position of the tire, however, the RFID tag is not protected by the metallic shield. If the RFID tag is applied to the initiator, therefore, the electronic components cannot be protected from impact at the time of airbag deployment.

The invention of Patent Literature 6 relates to the wireless tag (IC tag) which is mounted inside the hollow conductive pipe. The lead wire of the wireless tag is configured so as to form a coaxial line together with the conductive pipe if the radio wave frequency used in the wireless tag (RFID tag, IC tag) is lower than the cutoff frequency with respect to the hollow conductive pipe. In order to form a long continuous coaxial line with a uniform width and a uniform pipe diameter, the lead wire requires a predetermined width and a predetermined length enough to match the characteristic impedance. The lead wire cannot be incorporated into the igniter assembly for airbag systems which has a hollow pipe structure with a centerline length of ($\frac{1}{4}$)·$\lambda$ or less and diameters differing according to portions and short in length.

Furthermore, in an igniter assembly such as an inflator, while after ignition, ignition charge is burned and the airbag is reliably inflated, other devices and a human body shall be free from damage. In view of this, the igniter assembly has a structure such that the combustion is directed toward one direction (forward direction) of the airbag. For example, the structure is such that a reduced-diameter portion is formed inside the metal igniter collar and serves as a seating of the igniter so that a metal eyelet arrests the rearward reaction force caused by the pressure generated by the combustion of ignition charge. By this structure, the signal pin and the signal line located behind the eyelet are protected against damages due to impact. This structure differs greatly from the coaxial line or pipe model, which is the subject matter of the invention of Patent Literature 6, in which the metal pipe having a flat inner surface and the single centerline in the center thereof are arranged by regulating the coaxial outer diameter and the centerline width, which determine the impedance, to a predetermined size.

Further, in an igniter assembly such as an inflator, signal insulation can be regulated, but the impedance is not regulated, and there is typically a plurality of signal lines. Also, as for the diameter of the igniter collar, which is the equivalent of the cross-section of the coaxial line, the mechanical design takes priority over the impedance. Therefore, the diameters of the inlet, the reduced-diameter portion, etc. of the igniter collar vary according to portions. Further, in the case of two signal lines, the signal lines are away from the central axis and connected to signal pins. The signal pins, when viewed in the high-frequency equivalent circuit, enter the face of the eyelet to be connected to the ground. In the invention of Patent Literature 6, the structure is such that the signal line is directly connected to the wireless tag (IC tag).

That is, the length of the centerline (which corresponds to the signal line) of the interior of the coaxial line (which corresponds to the interior of the igniter assembly collar) in the invention of Patent Literature 6 is adjusted to a length such that an antenna effect can be exerted, for example, to ($\frac{1}{4}$)·$\lambda$ (about 8 cm in the case of a UHF-band radio wave). On the other hand, in an igniter assembly, such as an inflator, the length is limited, for example to 2 cm or less, resulting in a deviation from the theory of operation in the coaxial line model. It is therefore necessary to achieve IC tag communication in the igniter assembly by the operation model different from the coaxial line model.

It is one object of the present invention to provide a technology for incorporating an IC tag, whereby erroneous assembling, such as the reverse insertion of pins, can be automatically detected during the production process for assembling an igniter assembly before mounting in a vehicle, and to provide a technology for incorporating the IC tag, whereby IC tag information can be read with a signal cable in a connected state even after the igniter assembly is connected to the signal cable and mounted in the vehicle.

It is another object of the present invention to provide an IC tag incorporated igniter assembly, wherein the manufacturing information of the IC tag can be easily obtained from the outside by an IC tag communication reader/writer even if the igniter assembly is short in length and does not operate as an antenna due to the mechanical dimension or restrictions.

Means of Solving the Problems

A typical aspect of the present invention is as follows. There is provided is an igniter assembly for which an igniter and a conductive igniter collar retaining the igniter therein are integrated with an insulating layer interposed therebetween. The igniter includes: a metal eyelet partially covered with the insulating layer; a metal cover that retains the eyelet therein; an ignition charge disposed in a space in contact with one end face of the eyelet within the cover; a heating element connected to the one end face of the eyelet; and at least one conductive pin that passes through the insulating layer and is electrically connected to the heating element. The other end of the conductive pin is exposed from the insulating layer so that a current supply circuit for supplying an ignition current to the heating element is connected thereto from outside the igniter collar. An IC tag is disposed adjacent to the conductive pin within the insulating layer. The IC tag has an IC chip and a coil antenna wound around the IC chip. The igniter assembly has a length shorter than ¼ of a radio wavelength λ used in a reader/writer for the IC tag. The IC tag is disposed adjacent to the other end face of the eyelet opposite the one end face, at a perpendicular or nearly perpendicular angle and so that a surface of the coil antenna becomes parallel or nearly parallel to the conductive pin.

Advantageous Effects of Invention

According to the present invention, even if the length of the igniter assembly is shorter than ¼ of the radio wavelength λ used in the reader/writer for the IC tag, information on the IC tag can be read by the reader/writer for the IC tag. Especially in a state where the IC tag is incorporated in an automobile or the like as an airbag device, the information on the IC tag can be read from outside. Thus, it is possible to facilitate not only the quality management of the igniter or the igniter assembly, which has been heretofore difficult, but also the cause analysis or range determination of a failure detected for the igniter assembly during the operation thereof.

BRIEF DESCRIPTION OF DRAWINGS

FIG. 1A is a vertical sectional view of an IC tag incorporated igniter assembly according to a first embodiment of the present invention.
FIG. 2B is an enlarged perspective view of the IC tag of FIG. 1A.
FIG. 3 is a sectional view of a gas generator employing the igniter assembly according to the first embodiment of the present invention.
FIG. 5B is a schematic diagram showing the relationship between the current supply circuit of FIG. 5A and the automotive driver's seat shown in FIG. 4.
FIG. 6 is a perspective view showing an IC tag communication reader/writer and an igniter according to a second embodiment of the present invention.
FIG. 7 is a diagram for illustrating a configuration where the inserted positions of a first conductive pin P1 and a second conductive pin P2 of the igniter embedded with the IC tag are detected by the IC tag communication reader/writer at a predetermined position.

MODE FOR CARRYING OUT THE INVENTION

Figure 1B:
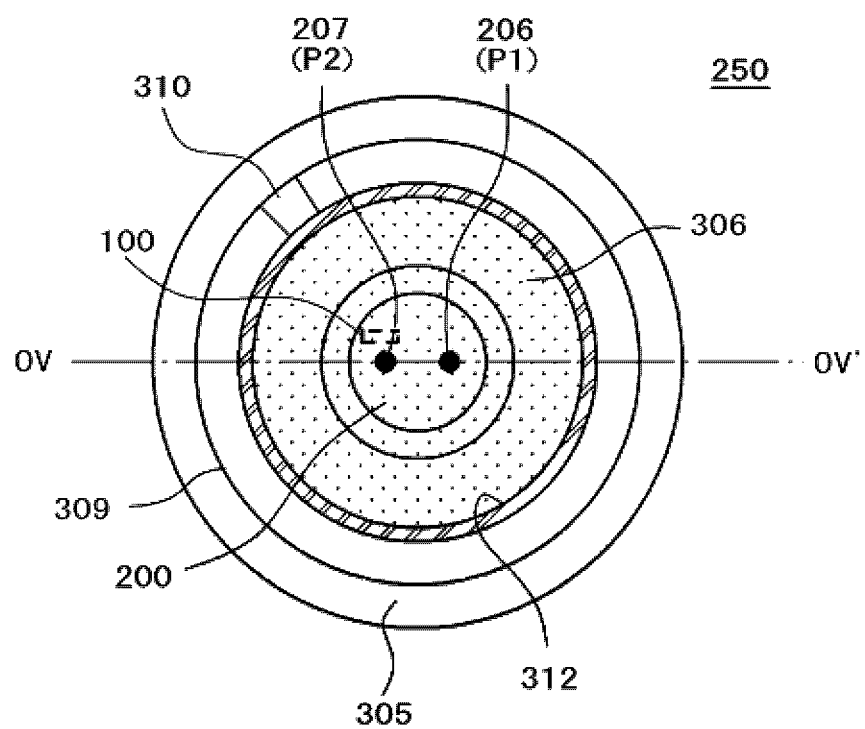
FIG. 1B is a plan view of FIG. 1A.

According to one aspect of the present invention, there is provided an igniter assembly in which an igniter body is disposed in insulation within an igniter collar that is a metal cylindrical member forming the igniter assembly, and at least one electric signal line (conductive pin) is led out from an internal circuit of the igniter body through an insulating layer, the igniter assembly being applied to an automotive airbag system. The length of the igniter assembly is shorter than ¼ of the microwave wavelength, particularly, the UHF-band radio wavelength λ. An IC tag is installed adjacent to the conductive pin of the igniter within the insulating layer at an angle perpendicular or nearly perpendicular to a first end face of an eyelet opposite an ignition charge and at an angle parallel or nearly parallel to the conductive pin. The other end of the conductive pin is configured to be connectable to a current supply circuit through a signal cable with a connector interposed therebetween. The IC tag is disposed in a positional relation with respect to the conductive pin such that the IC tag is operated by the mutually-induced current that a magnetic flux line generated by a high-frequency current supplied to the conductive pin through the signal cable induces in a coil antenna wound around the IC chip. The IC tag is installed directly on or adjacent to the end face of the eyelet, and thus the eyelet serves as the ground G, thereby allowing an increase in the magnetic flux generated by the high-frequency current, and consequently, an improvement in detection sensitivity by the mutually-induced current.

According to another aspect of the present invention, there is provided an igniter assembly in which at least one electric signal line (conductive pin) is led out through an insulating layer from an internal circuit of a metal cylindrical body forming the igniter assembly, the length of the igniter assembly being shorter than ¼ of the UHF-band radio wavelength λ. An IC tag is installed adjacent to the conductive pin of the igniter within the insulating layer at an angle perpendicular or nearly perpendicular to a first end face of an eyelet opposite an ignition charge and at an angle parallel or nearly parallel to the conductive pin. The other end of the conductive pin is configured to be connectable to a current supply circuit through a signal cable with a connector interposed therebetween. In this case, the IC tag is incorporated in the immediate vicinity of the conductive pin to be detected in a shield vessel (igniter collar), and IC tag communication is performed by transmitting, with pin-point accuracy, the UHF-band electromagnetic waves of a reader/writer from outside the insulating layer to the immediate vicinity of the conductive pin to be detected and invoking the IC tag set in a direction perpendicular thereto across the insulating layer therefrom. It is to be noted that a primary current flows through the coil antenna at the distal end of a detection portion of the IC tag reader/writer, and the coil antenna of the IC tag is located on the opposite side of the insulating layer therefrom, the two coil antennas being perpendicular to each other. This arrangement, as described in detail later, causes electromagnetic coupling between the coils of the two antennas, so that a secondary current is induced in the coil antenna of the IC tag by the mutual induction. That is, the IC tag is operated by inducing the secondary current from the high-frequency primary current, and IC tag information is inversely induced from the secondary current to the primary current.

According to still another aspect of the present invention, there is provided an igniter assembly in which at least one electric signal line (conductive pin) is led out through an insulating layer from a circuit disposed inside a metal member forming the igniter assembly, the igniter assembly being applied to an automotive airbag system. The length of the metal member is shorter (for example, about 20 mm or less) than the dimension of an antenna that operates by resonating at the UHF-band radio wavelength of a reader/writer used. An IC tag is installed adjacent to the conductive pin of the igniter within the insulating layer at an angle perpendicular or nearly perpendicular to a first end face of an eyelet opposite an ignition charge and at an angle parallel or nearly parallel to the conductive pin. The other end of the conductive pin is configured to be connectable to a current supply circuit through a signal cable with a connector interposed therebetween. The length of the signal cable from the connector to the current supply circuit is longer than the half wavelength of the radio wave radiated from the reader/writer for the IC tag using the UHF-band radio wave. That is, the signal cable has a length of 20 cm or more. Thus, a standing wave due to the radiated wave from the IC tag communication reader/writer is generated in the signal cable by the IC tag communication reader/writer. The IC tag is operated by the standing wave.

Thus, even if the IC tag is installed in the igniter collar made of metal, the standing wave is transmitted through the signal line to the IC tag, thereby allowing the IC tag communication. Consequently, specific identification information on the igniter assembly, such as the production lot information or shipping information based on the ID number, can be acquired by the IC tag reader/writer. Thus, the reliability of each device assembled as a final product is also improved. In addition, the cause analysis of a failure detected in the igniter assembly during the operation thereof can be performed.

In particular, even if the distal end of the detection portion of the IC tag reader/writer cannot be directly inserted into the igniter because of the incorporation of the igniter assembly in the steering wheel of a vehicle body, etc., it is possible to perform IC tag communication in a contactless manner from outside the steering wheel, for example. Therefore, in the event that the igniter assembly including the IC tag becomes a product to be recalled, the confirmation of the production lot information or shipping information based on the ID number is facilitated.

It should be noted that the component (current supply component) for supplying an ignition current refers to a connector directly connected to the pin or a lead wire connected to the pin by welding or brazing.

Hereinafter, the embodiments of the present invention will be described in detail with reference to the accompanying drawings.

First Embodiment

Now referring to FIGS. 1A to 5B, description will be made on an igniter, an igniter assembly, and an airbag system employing the same according to a first embodiment of the present invention.

FIG. 1A is a vertical sectional view of an igniter 200 according to one embodiment of the present invention, and FIG. 1B is a plan view of FIG. 1A.

The igniter 200 and a conductive igniter collar 305 retaining the igniter therein are integrated as the igniter assembly.

The igniter 200 has a charge holder 201, a header 202, a hollow columnar eyelet 209 fixed to the header 202, and a cylindrical cover 203. An ignition charge 204 (ignition charge 204a, 204b) is sealed in space surrounded by the charge holder 201, the cover 203, and the lower surface (second end face) of the eyelet 209. A first electrode (one end of a first conductive pin 206(P1)) and a second electrode (the lower surface (second end face) of the eyelet 209 connected to one end of a second conductive pin 207 (P2)) are electrically interconnected by a bridge wire 205. The side (the base portion) of the conductive pins (P1 and P2) on which the first and second electrodes are located is sealed with an insulating layer made of resin. Reference sign 208 denotes a robust insulating material, such as a glass member. The charge holder 201, the eyelet 209, and the cover 203 are formed from metal. Furthermore, a tabular IC tag 100 is embedded in a resin 311 in such a manner that the coil surface thereof is disposed along the second conductive pin P2, and perpendicularly on the top surface (first end face) 2090 of the eyelet 209. More specifically, the tabular IC tag 100 is disposed adjacent to the second conductive pin 207 (P2) within the header 202 formed of the resin 311. The IC tag 100 is embedded in the resin 311 in such a manner as that the coil surface thereof is set in a direction parallel to the axis OH-OH' of the igniter assembly passing through the center between the first conductive pin (center pin, P1) and the second conductive pin (eyelet pin, P2), especially in such a manner that one end of the coil surface thereof is set adjacent to and along the second conductive pin P2, which is the ground (earth) side, and perpendicularly on the top surface 2090 of the eyelet 209.

The metallic shield vessel (igniter collar) 305 is fixed to the outer periphery of the header 202. The inside of this igniter collar defines a cylindrical connector-insertion space (connection space for a current supply component) 306 which is covered with a resin 312. The first conductive pin 206 and the second conductive pin 207 protrude into the insertion space 306 for connecting the current supply component. A space 314 for putting the igniter in place is also formed inside the igniter collar. Further, a positioning portion 310 is provided at a portion of the upper end face 309 of the igniter collar 305.

Figure 2A:
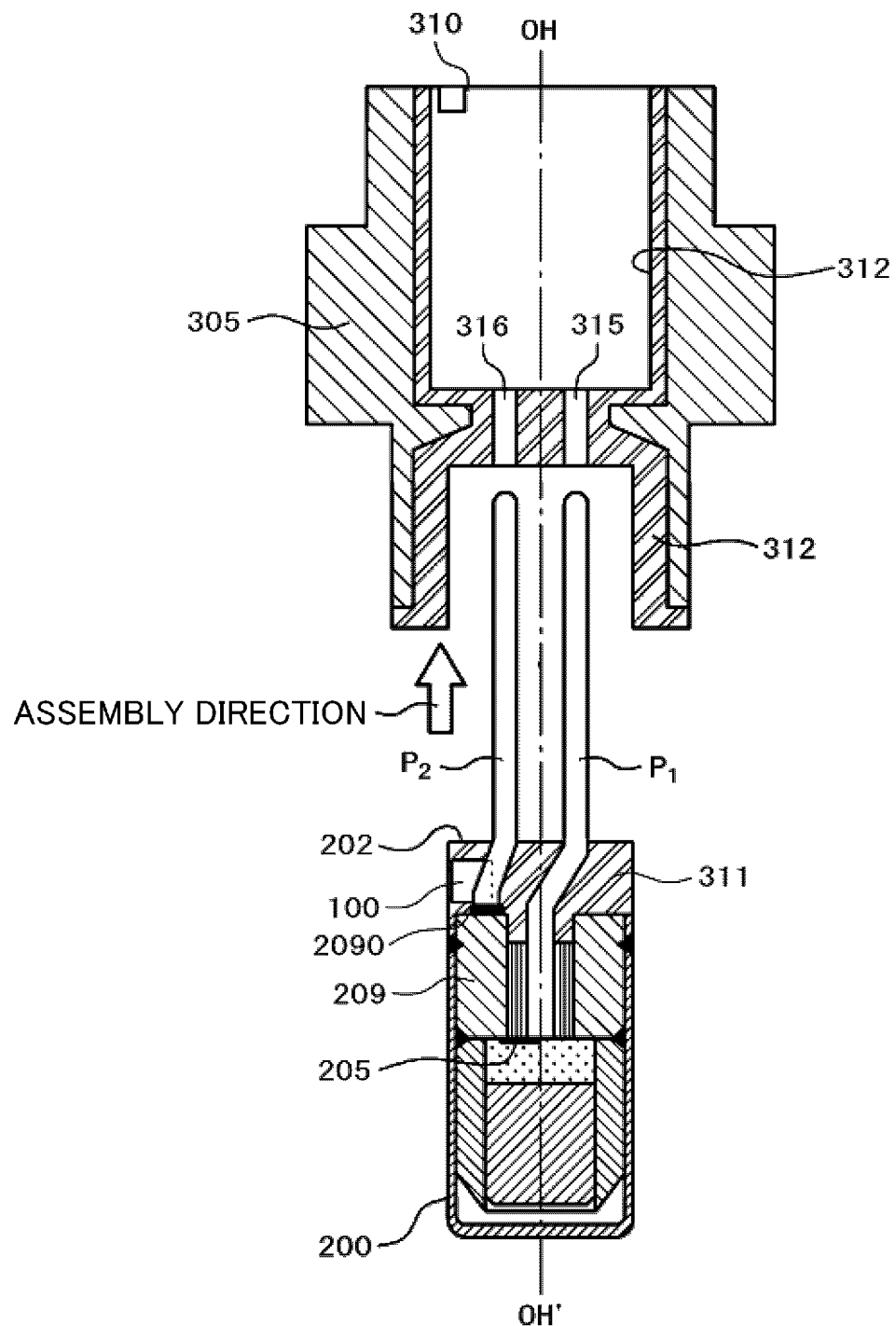
FIG. 2A is a vertical sectional view for illustrating an assembly method for the igniter assembly according to the embodiment, showing a state thereof before assembly.

A reduced-diameter portion is formed within the igniter collar 305, and the resin disposed inside the reduced-diameter portion is formed with holes 315 and 316 into which the conductive pins (P1 and P2) are inserted (see FIG. 2A). The reduced-diameter portion of the igniter collar 305 serves as a seating of the header 202 of the igniter and has a structure such that the metal eyelet 209 arrests the rearward reaction force (toward the igniter collar 305) caused by the pressure generated by the combustion of ignition charge. With this structure, the impact force caused by the high-pressure gas of a gas generator generated by the ignition of the ignition charge 204 located forward of the eyelet is received by the charge holder 201, the eyelet 209, the insulating material 208 located inside the eyelet 209, etc., and then the impact force is directed toward the airbag (forward), so that the IC tag 100 and conductive pin located rearward of the eyelet, or the signal line and the like located further rearward is protected from the impact.

It should be noted that the IC tag 100 may be disposed in a region where the space, with the conductive pins passing therethrough, formed by the reduced-diameter portion of the igniter collar 305, is projected. That is, the arrangement may be such that the IC tag 100 is retained by the reduced-diameter portion of the igniter collar 305 in place of the eyelet 209 and the tabular IC tag 100 is embedded in the resin 312, perpendicularly on the flat top surface of the reduced-diameter portion opposite the ignition charge 204 (connector insertion space side) and in such a manner as that the coil surface thereof adjacent to the second conductive pin 207 (P2) is set in a direction parallel to the axis OH-OH' of the igniter assembly. This is because in the configuration of FIG. 1A, there is a possibility that the eyelet is pressed against the reduced-diameter portion of the igniter collar due to the melting of the resin at the high temperatures and pressures during the operation of the igniter. Therefore, the IC tag is disposed on the opposite side of the reduced-diameter portion from the ignition charge 204, thereby avoiding a situation in which the IC tag is crushed between the eyelet and the reduced-diameter portion. Also in this case, the IC tag is installed directly on or adjacent to the top surface of the reduced-diameter portion of the metal igniter collar so that the metal reduced-diameter portion serves as the ground G, thereby allowing an increase in the magnetic flux generated by a high-frequency current, and consequently, an improvement in detection sensitivity by the mutually-induced current. In the same way, in the embodiments to be described below, the tabular IC tag 100 may be disposed on the top surface of the reduced-diameter portion in place of the eyelet.

According to the present invention, an integrated assembly of the metallic shield vessel (igniter collar) and the igniter are defined as the igniter assembly. Although the igniter assembly has a variety of different sizes for different uses, the length in the axis OH-OH' direction (hereinafter, simply referred to as the igniter assembly length) Lb is shorter than ¼ of the microwave wavelength, particularly, the UHF-band radio wavelength λ. In other words, the igniter assembly length Lb is short and does not resonate with the UHF-band radio wave. That is, the igniter assembly length Lb is determined for convenience of mechanical design or the like and cannot be regulated to a predetermined length allowing the resonance. For example, the igniter assembly length Lb is about 20 mm or less. Furthermore, the radio wave frequency used in the RFID system is lower than the cutoff frequency of a hollow portion of the igniter assembly, for example, the cylindrical connector-insertion space 306. In one example, the diameter in a direction perpendicular to the axis OH-OH' of the igniter 200 is, for example, about 8 mm or less. Furthermore, the maximum diameter of the igniter collar is, for example, in the range of 15 to 20 mm, or less.

It is essential only that the IC tag 100 be associated with either one of the first conductive pin (P1)206 and the second conductive pin (P2)207 and embedded in the header 202 perpendicularly on the top surface (first end face) 2090 of the eyelet 209.

The portion 309 also serves as an annular flange provided at an end of the connector insertion space 306. The positioning portion (recessed/protruding structure) 310 extended in a direction perpendicular to the axis OH-OH' (radial direction) is provided on the side of the annular flange which corresponds to the IC tag 100. The positioning portion 310 serves as a positioning portion for an IC tag communication reader/writer to be described later. It should be noted that the positioning portion 310 is not limited to the recessed/protruding structure but may have any structure, such as a combination of a positioning pin and a hole, which can fix the relative positional relation between the conductive pin (P1, P2) of the igniter 200 and the IC tag communication reader/writer.

The IC tag 100 has a tabular shape, and is disposed such that one side of the tabular surface is set parallel to the axial direction of the conductive pin or along the surface of the conductive pin. As a result, the IC tag 100 is vertically erected approximately perpendicular to the first end face of the eyelet 209 at the base of the conductive pin (either P1 or P2) protruding outwardly from a heating element in the igniter 200. The one side of the surface of the tabular IC tag 100 is installed so as to be aligned parallel to the surface of the conductive pin. In this manner, the IC tag 100 is vertically disposed approximately perpendicular to the surface of the insulating layer (or the bridge wire) of the igniter 200 (perpendicular arrangement). It should be noted that the IC tag 100 does not necessarily have to be vertically disposed but may be disposed with inclination in the header 202 as needed in a relation with another component, for example in the case where the IC tag 100 cannot be stored in the dimensions of the IC tag arrangement space 314. In such a case, however, the arrangement must be such that the mutual induction relation between a detection portion of the IC tag communication reader/writer and a coil antenna 102, which is located inside the IC tag 100, is established. Furthermore, in a case where the igniter 200 also incorporates additional electronic circuits therein, the number of the conductive pins can be three or more.

As described above, the IC tag 100 is sealed in the resin insulating layer (header 202) forming the header 202, in the vicinity of the conductive pins (P1, P2). Specifically, the igniter 200 along with the heating element and the bases of the conductive pins (P1, P2) contained therein is inserted in the metallic shield vessel (igniter collar) 305 and sealed with the resin insulating layers 311 and 312. After it is sealed, therefore, only the conductive pins (P1, P2) extend outward while the IC tag 100 is normally out of sight. Even if the igniter 200, with the conductive pins (P1, P2) turned 180° and reversed left to right, is disposed inside the metallic shield vessel (igniter collar) 305 (reversed insertion) and sealed with the resin, the polarities of the conductive pins (P1, P2) cannot be visually determined. FIG. 1B depicts the IC tag 100 with a dotted line so as to purposely visualize the tag for convenience of explanation.

An example of an assembling method for the igniter assembly according to this embodiment will be described with reference to FIG. 2A. FIG. 2A is a vertical sectional view showing a state before the igniter 200 and the igniter collar 305 are integrally assembled.

The connector insertion space 306 and the space 314 for placing the igniter 200 are formed inside the metallic shield vessel (igniter collar) 305. The igniter assembly is assembled as shown in FIG. 1A by inserting the igniter 200 in the space 314 in the igniter collar, followed by filling the resin 312 in the space for unifying the igniter with the shield vessel. The IC tag 100 is embedded along the second conductive pin P2. As an example of the assembly, the tabular IC tag 100 is temporarily fixed by, for example, an adhesive, or mechanically assembled, at an angle perpendicular or nearly perpendicular to the flat top surface 2090 of the eyelet 209 in such a manner that one end of the coil surface thereof is aligned adjacent to the axial direction of the second conductive pin P2 close to the ground (earth) side. Then the IC tag 100 is embedded in the insulating layer 311 in process of fixing the header 202, including the resin insulating layer 311, and the eyelet 209.

For illustrative purposes, FIG. 2A shows a state where the resin 312 is applied to the metallic shield vessel (igniter collar) 305, the resin 312 being formed with the holes 315 and 316 for the passage of the conductive pins (P1, P2). However, these holes are formed by the conductive pins (P1, P2) when the resin 312 is injected in the space, and the resin 312 and the holes are not formed in advance in this embodiment.

It does not matter if the resin 312 and the header 202 of the igniter 200 shown in FIG. 2A are assembled by another method, such as simultaneous resin-molding. Any method is usable so long as the configuration of FIG. 1A is eventually obtained.

FIG. 2B is an enlarged perspective view of the IC tag 100. The IC tag 100 has an IC tag main body provided on the surface side of a tabular substrate, and an IC-tag insulating substrate 103 formed on the back side of the substrate. The IC tag main body is composed of: an IC chip 101; the planar coil antenna 102 spirally wound in a plurality of turns around the IC chip 101; and a protective material. The coil antenna has an inner end connected to the IC chip 101 and an outer end connected to the IC chip 101 with the insulating layer on the back side interposed therebetween.

It should be noted that the UHF band or microwave band IC tags are roughly divided into: (1) an IC tag which is about 10 cm long on a side and incorporates therein a half-wavelength resonant dipole antenna with notable wavelength dependency; and (2) an ultra-small IC tag which is 10 mm or less long on a side and incorporates therein a resonant circuit employing a coil or capacitor free from wavelength dependency. The coil constituting the resonant circuit of the above (2) includes, for example, the planar coil formed on the tabular substrate as shown in FIG. 2B and an unillustrated cylindrical coil. The coil has an invisible stray capacity and may sometimes permits omission of a capacitor as a part element. FIG. 2B shows this connection omitting the capacitor.

The type of the IC tag 100 for use in the igniter or the igniter assembly of this embodiment may be decided according to the structure or the like of the igniter or the igniter assembly. If priority is given to microminiaturization, the above-described ultra-small tabular IC tag is suitable.

FIG. 3 is a sectional view showing a gas generator 300 employing the igniter assembly, signal cables L1 and L2 connected to the gas generator 300, and a connector 460 for the signal cables L1 and L2. The gas generator 300 is configured from a metallic shell vessel having pressure resistance and is centrally formed with a cylindrical opening in which a metallic cylindrical member 304 having pressure resistance is fixed. The igniter 200 is fixed in a space deep inside the cylindrical member. Reference sign 2066 denotes an electrode for fitting the first conductive pin 206; 2077 denotes an electrode for fitting the second conductive pin 207; and 401 and 402 each denote a connection portion between the connector 460 and a signal cable 470 (4701, 4702). The signal cable may include a coaxial cable, parallel cable, or twisted pair wire.

It should be noted that although the igniter assembly including the igniter 200 as shown in FIG. 3 is not exactly the same in configuration as the igniter assembly shown in FIG. 1A, these igniter assembly are the same in the basic structure that the IC tag 100 is installed in the resin adjacent to the conductive pin (P1, P2).

In the gas generator 300, a gas generating agent mold 302 is filled in space outside the metallic cylindrical member 304. Reference sign 303 denotes a gas discharge port.

In the present invention, the ultra-small IC tag is employed for the purpose of incorporating or attaching the IC tag in or to the igniter 200. Examples of the IC tags suitable for such compact applications include an ultra-small UHF band tag having external dimensions of 2.5 mm×2.5 mm and a thickness of 0.4 mm (IM5-PK2525 tag (registered trademark) of Hitachi Chemical Co., Ltd.). For example, this tag can achieve carry on the order of several millimeters at a predetermined detection radio wave output from the IC tag communication reader/writer.

Figure 4:
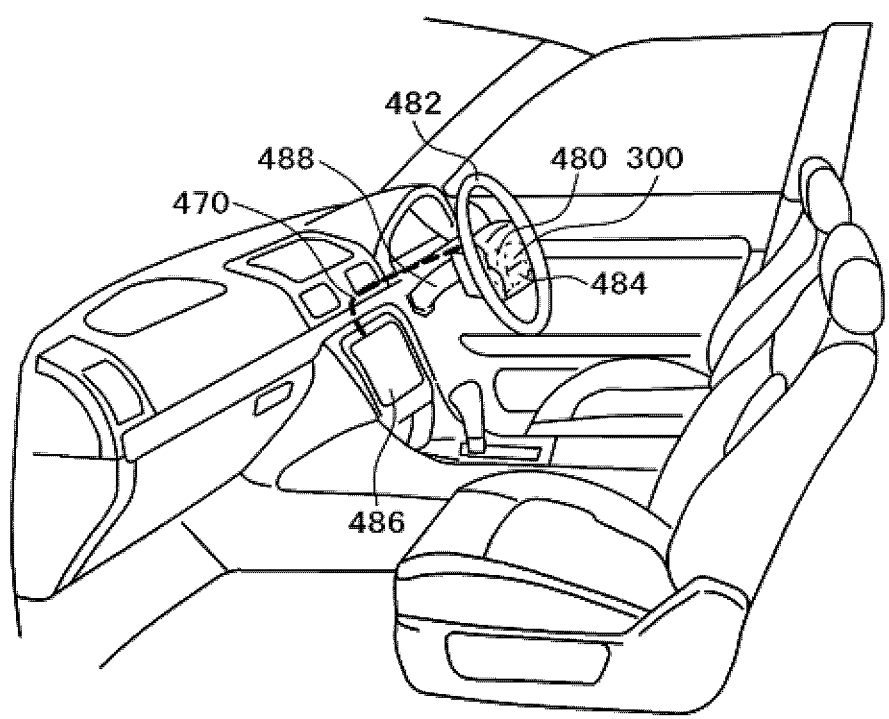
FIG. 4 is a diagram showing the external appearance of an automotive driver's seat equipped with an airbag system to which the present invention is applied.

FIG. 4 is a diagram showing an example of the external appearance of an automotive driver's seat equipped with an airbag system to which the present invention is applied. Reference sign 480 denotes a steering wheel of the driver's seat; reference sign 482 denotes a steering wheel ring; and reference sign 488 denotes a steering wheel shaft. An airbag device 484 including the gas generator 300 is incorporated in the steering wheel 480. The airbag device is equipped with a plurality of squibs as igniters therefor as disclosed for example in Patent Literature 2. In the steering wheel of general vehicles, the core material or hollow rim is formed from a metallic material, such as steel, magnesium alloy or aluminum, and is externally covered with a soft cover made of a nonmetallic material, such as urethane resin or polypropylene, as a surface material. The signal cable 470 is disposed between the metallic core material or rim and the non-metal cover, or partially disposed in space inside the metallic hollow rim, according to the configuration of the steering wheel 480.

Furthermore, reference sign 486 denotes a display panel, such as meters or car navigation equipment, provided to the driver's seat. The current supply circuit (ECU) disposed on the back surface of the display panel or in the engine room and the igniters (squibs) of the airbag device 484 are connected by the signal cable 470. The signal cable 470 from the connector 460 to the current supply circuit 400 has a length of at least 20 cm. It should be noted that, although a plurality of the airbag devices 484 are normally incorporated in the driver's seat, description will be given in terms of the single airbag device for the sake of clarity.

Next, an example of the current supply circuit 400 connected to the igniter 200 of this embodiment will be described with reference to FIG. 5A.

The current supply circuit 400 is provided in an ECU of an automobile, for example. The airbag system installed in a vehicle has an ECU including the current supply circuit 400, and a plurality of airbag modules connected to the ECU, each of the airbag modules having the gas generator 300 and airbag accommodated in a case. The ECU, including the current supply circuit 400, and the gas generators 300, are connected to the airbag modules by respective conductors.

The current supply circuit 400 is formed on, for example, a single substrate. The substrate is equipped, at one end thereof, with the connection portions (connection terminals) 401, 402 for connections to the connector 460 for electrically connecting the current supply circuit 400 to the first conductive pins 206 (P1) and the second conductive pins 207 (P2) of the igniters 200 through the signal cables 4701, 4702. Here, for convenience of explanation, it is assumed that the first conductive pin 206 is connected to a positive electrode and the second conductive pin 207 is connected to a negative electrode (earth). The current supply circuit 400 has various elements arranged on the substrate, the elements at least including: switching circuits 410, 411; pulse generators 412, 413; a disconnection detection circuit 414; a voltage converter 421; and a capacitor 420. The current supply circuit 400 is interposed in a current path which interconnects, with an ignition switch 431 therebetween, a battery 430 serving as an external DC power source and the igniters 200 incorporated in the gas generators 300. The single igniter 200 is equipped with two current paths, each of which is formed from two conductors (lead wires). The switching circuits 410, 411, the pulse generators 412, 413, and the disconnection detection circuit 414, which are arranged on the substrate, are further connected to a microcomputer unit (MCU) 422 through an interface 415. The MCU 422 is connected with a ROM 423 and is further connected, through an interface 424, to an impact detecting sensor 440 and other components 450, such as an engine controller and brake sensor, which are located outside the substrate.

Figure 5A:
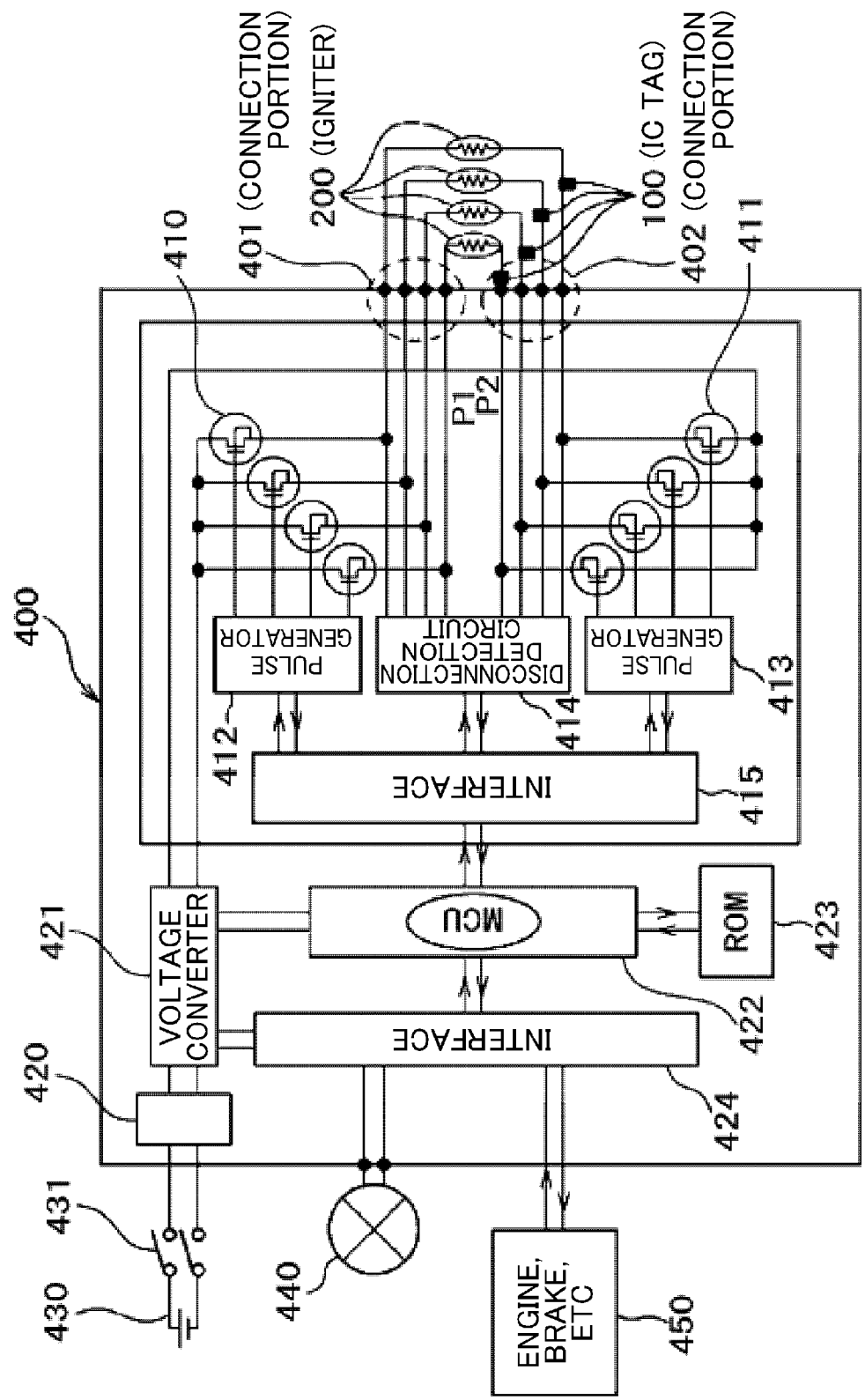
FIG. 5A is a schematic diagram of a current supply circuit connected to the igniter according to this embodiment.

FIG. 5B is a schematic diagram showing the relationship between the current supply circuit of FIG. 5A and the automotive driver's seat shown in FIG. 4. The connector 460 of the igniter assembly 250 of the airbag system incorporated in the steering wheel 480 formed from a metal pipe or the like is connected through the signal cable 470 and a coupler 472 to the switching circuits 410, 411, the voltage converter 421, and the MCU (an airbag control circuit) 422 of the current supply circuit (ECU) 400 on the vehicle side. In the present invention, the length (=Lc) of the signal cable 470 between the connector 460 and the current supply circuit (igniter drive circuits 410, 411, etc.) with the coupler 472 interposed therebetween is as the signal cable length. The length Lc of the signal cable 470 is at least 20 cm, preferably 30 cm or more.

However, in the case where the signal cable 470 is partially disposed inside the metallic hollow rim of the steering wheel 480, the portion of the signal cable which is exposed outside the metallic hollow rim through the coupler 472 needs to have a length of at least 8 cm or more. It should be noted that, although there is no particular upper limit to the signal cable length, it is practically in the range of one to several meters.

Not only the single-type gas generator shown in FIG. 3 but also a dual-type gas generator or the like can be used as the gas generator accommodated in the airbag module case, and the form or structure thereof is not limited.

The airbag device has at least one or a plurality of igniters 200. While FIG. 5A shows the four igniters 200 in the current supply circuit 400, these igniters are provided as, for example, inflators for the airbag device 484 of a driver's seat, and the IC tag 100 is embedded in each igniter. Airbag inflators for a passenger seat and the like are also connected to the common current supply circuit 400 through the signal cable in the same manner.

It should be noted that the IC tag 100 may be embedded on either the first conductive pin (P1) side or the second conductive pin (P2) side, and, in the example of FIG. 5A, the IC tag 100 is installed in each igniter on the second conductive pin (P2) side. The IC tag 100 can be used to externally acquire the specific identification information, such as ID number, and manufacturing information on each igniter when the current supply circuit is connected to the signal lines.

The switching circuits 410, 411 of the current supply circuit 400 are operative to open and close the current path. Each of the switching circuits cuts off the direct current when the igniter 200 need not be operated, and starts to supply the current when the igniter 200 is operated. The switching circuits 410, 411 are provided for each current path (on a one-on-one basis). The disconnection detection circuit is configured to detect a failure in the igniter (such as, contact failure between a heating portion of the igniter and the ignition charge, or the disconnection of the heating portion) with a weak current.

The switching circuits 410, 411 are connected to the pulse generators 412, 413, respectively, by the conductors, and each opened or closed by the transmission of a control pulse for instructing the opening or closing of the switching circuit from the corresponding pulse generator. The control pulse transmission instruction to the pulse generator is transmitted from the MCU 422 responding to a command from the impact detecting sensor 440. The switching circuits 410, 411 are formed from a thyristor, MOS-FET, bipolar transistor or the like. The switching circuits may be provided only on the positive electrode side.

The current supply circuit is energized only by the battery. The capacitor 420 stores a required current as a backup power source so as to supply the current in place of the battery when the supply of current from the battery is cut off.

At the time of vehicle collision, a command from the impact detecting sensor is transmitted to the ECU, which transmits to the pulse generator a command for closing the switching circuit. According to this command, the current from the battery, as an ignition pulse for triggering the igniter, is transmitted to the igniter 200 through the current path. In response to this ignition pulse, the ignition charge in the igniter 200 is ignited to deploy the airbag.

Up to now, the igniter or the igniter assembly per se has been so small in size that the labeling or identification from the imprint has been quite difficult. According to this embodiment, incorporation of the IC tag allows not only the quality management of the igniter or the igniter assembly, which has been heretofore difficult, but also the cause analysis of a failure detected in the igniter assembly during the operation thereof. In this respect, this embodiment means much in that the object to incorporate the IC tag is the igniter or the igniter assembly which is small in size and subjected to heat or impact upon actuation.

The igniter and igniter assembly according to this embodiment are applicable to a variety of inflators (gas generators), such as an inflators for driver's seat airbags, inflator for passenger seat airbags, inflator for side airbags, inflator for curtains, inflator for knee bolsters, inflator for inflatable seat belts, inflator for tubular systems, and inflator for pretensioners.

Modification

It should be noted that, in the igniter assembly in which the IC tag is incorporated adjacent to the conductive pin and these components are integrally resin-molded as in the present invention, the current supply component connected to the conductive pin is not limited to the connector of the first embodiment, and may also, alternatively, be a lead wire connected to the conductive pin by welding or brazing. Alternatively, in place of the pair of conductive pins or the eyelet, the configuration similar thereto may be adopted. More specifically, according to a modification of the first embodiment, the ignition assembly is equipped with: a metal inner cup (cylindrical cover) that is fixed within a nonconductive cup-shaped case; a metallic hollow columnar sleeve (eyelet) that is fixed within the inner cup; an ignition charge that is filled in a space formed at the leading end in the inner cup, the space being located on the lower surface side of the hollow columnar sleeve; a center pin (P1) that is axially disposed at the center in the inner cup; a bridge wire that is bridged between the leading end face of the center pin and the lower end face (second end face) of the hollow columnar sleeve and brought into contact with the ignition charge; a pair of leads that are connected to the other end of the center pin (P1) and a connection portion (equivalent to P2) connected to the hollow columnar sleeve by welding or brazing; and an insulator that insulates the center pin, the hollow columnar sleeve, the connection portion, and the pair of leads within the inner cup. The portion equivalent to the cylindrical connector-insertion space of the first embodiment is covered with the insulator. In this case, it is sufficient if the tabular IC tag is disposed parallel to the conductive pin in association with either the conductive pin (P1) or the portion (equivalent to P2) and embedded in the insulator in the inner cup at an angle perpendicular or nearly perpendicular to the upper end face (first end face) of the hollow columnar sleeve (eyelet). Also in this case, the signal cable length (=Lc) between the lead of the igniter assembly and the igniter drive circuit with the coupler interposed therebetween is at least 20 cm, preferably 30 cm or more.

Second Embodiment

Even if the igniter assembly has a structure in which it is unnecessary to detect the reversed insertion of the conductive pins, it is important to adopt the igniter assembly incorporating the IC tag therein in order to analyze the cause of failure or determine the range of failure on occurrence of failure. For example, the igniter for use in the igniter assembly may be provided with a single conductive pin.

According to a second embodiment of the present invention, an igniter assembly is equipped with: a metal inner cup (cylindrical cover) that is fixed within a nonconductive cylindrical case (equivalent to the header of the first embodiment); a metallic hollow columnar header (eyelet) that is fixed within the inner cup; an ignition charge that is filled in a space formed at the leading end in the inner cup, the space being located on the one end face side of the hollow columnar header; a single center pin (P1) that is fixed to a hollow portion of the hollow columnar header by an insulating material; a bridge wire that is bridged between the leading end face of the center pin and the one end face (second end face) of the hollow columnar header and brought into contact with the ignition charge; a lead that is connected to the other end of the center pin (P1); an insulator that insulates the center pin, the hollow columnar header, and the lead within the inner cup; and a cylindrical connector-insertion space that corresponds to the center pin. In this case, it is sufficient if the tabular IC tag is disposed parallel to the conductive pin in association with the conductive pin (P1) and embedded in the insulator in the inner cup at an angle perpendicular or nearly perpendicular to the other end face (first end face) of the hollow columnar header (eyelet). Also in this case, the signal cable length (=Lc) between the connector connected to the center pin and the igniter drive circuit with the coupler interposed therebetween is at least 20 cm, preferably 30 cm or more.

According to this embodiment, even if the object to incorporate the IC tag is the igniter assembly which is small in size and subjected to heat or impact upon actuation, or even in the case of the igniter assembly embedded in the resin and correctly assembled, it is possible to easily detect the IC tag from outside.

Third Embodiment

Next, description will be made on a third embodiment of the present invention which pertains to means for detecting whether or not the igniter 200 and the connection portions 401, 402 of the connector 460 connected to the current supply circuit 400 as described in the first embodiment are properly connected, in other words, means for detecting whether or not the assembly is the reverse-insertion assembly in which the first conductive pin P1 and the second conductive pin P2 are reversely inserted.

FIG. 6 is a perspective view showing an IC tag communication reader/writer 500 and the igniter 200. The IC tag communication reader/writer 500 is equipped with: an operation portion 501 and a display portion 502 which are provided on the surface of the main body thereof; a high-frequency antenna circuit (not shown), a power source and a control circuit (not shown) which are provided inside the main body; and a detection portion 510 integrally provided at the leading end of the main body. The antenna in the main body and the detection portion 510 are interconnected by a pair of signal transmission portions T (cables T1 and T2) 511, 512 extending downwardly from the leading end of the main body. The antenna circuit located inside the main body and the detection portion 510 exposed to the outside define a minute-loop detecting coil having a coil surface in a direction perpendicular to the axes of the pair of signal transmission portions 511, 512. While the figure shows the minute-loop detecting coil 510 (D) having a single coil turn, the number of coil turns may be two or more in the interest of circuit efficiency such as high-frequency matching. The IC tag communication reader/writer 500 also has a fitting portion (recessed portion or protruding portion) 503. The fitting portion 503 is mechanically fitted in a depth H of the positioning portion (recessed/protruding structure) 310 of the gas generator 300 (or the igniter assembly), whereby the detecting coil of the detection portion 510 is fixed at a predetermined position in the cylindrical connector-insertion space 306, made of insulating resin, of the igniter 200, more specifically, at the position and in the predetermined depth H in the igniter 200 where the IC tag 100 can be detected.

Furthermore, the fitting portion 503 positions the IC tag communication reader/writer 500 at the predetermined position relative to the igniter assembly and serves as a mark for the distinction between "normal position", where the second conductive pin P2 is disposed in the immediate vicinity of the fitting portion 503 and the first conductive pin P1 is disposed on the far side therefrom, and "erroneous position", where the conductive pins are reversely inserted. It should be noted that the electromagnetic wave output is adjusted such that the IC tag 100 can be detected when the detection portion 510 is fitted in the predetermined depth H of the fitting portion 503.

FIG. 7 is a vertical sectional view showing a state where the fitting portion 503 of the IC tag communication reader/writer 500 is fitted into the positioning portion 310 of the igniter assembly so that the detection portion 510 is mechanically set at a predetermined rotational position and the predetermined depth in the connector insertion space 306. More specifically, the figure shows the state where the detection portion 510 is inserted in the connector insertion space 306 so as to be located in the immediate vicinity of the IC tag 100. In this state, the detecting coil 510(D) of the detection portion of the IC tag communication reader/writer 500 and the coil of the IC tag are electromagnetically coupled to each other so that the secondary current corresponding to the primary current in the detecting coil is induced in the coil antenna of the IC tag by the mutual induction. Thus, even in the case of the ultra-small IC tag 100 having a short carry on the order of several millimeters and incorporated in the base of the second conductive pin P2, the presence or absence thereof can be detected in a contactless manner.

Figure 8A:
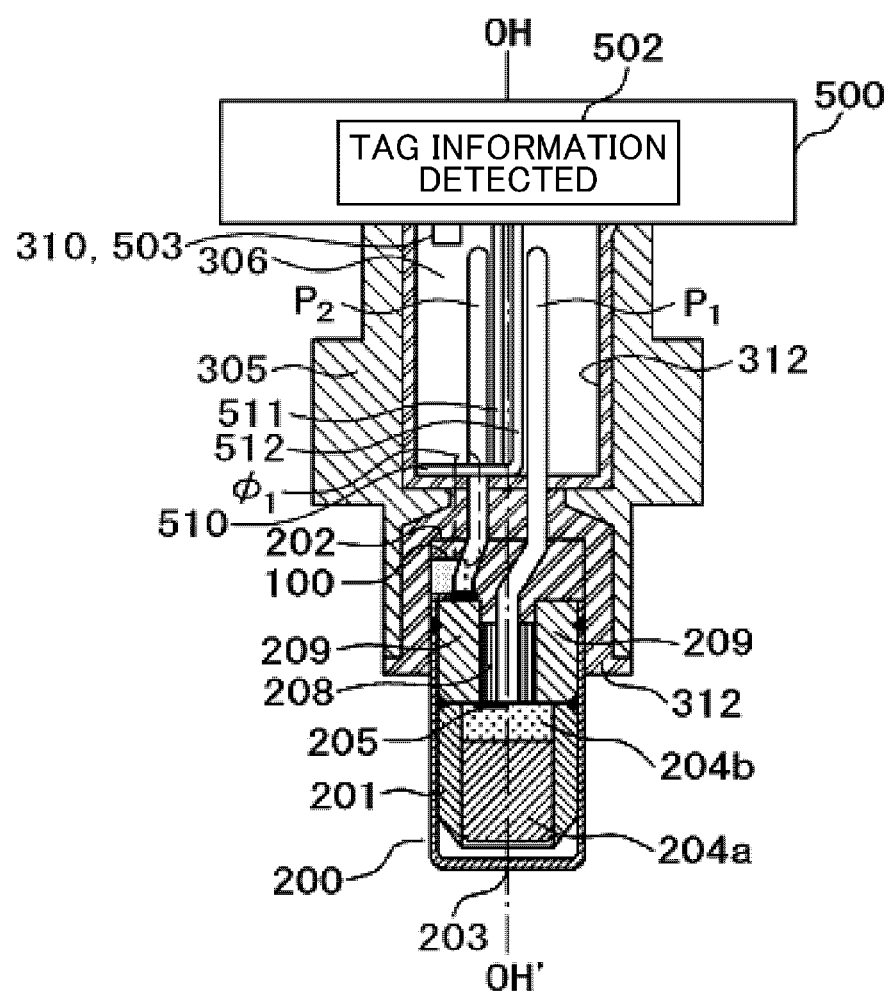
FIG. 8A is a diagram showing a state where the first conductive pin P1 and the second conductive pin P2 of the igniter are inserted in normal positions.
Figure 8B:
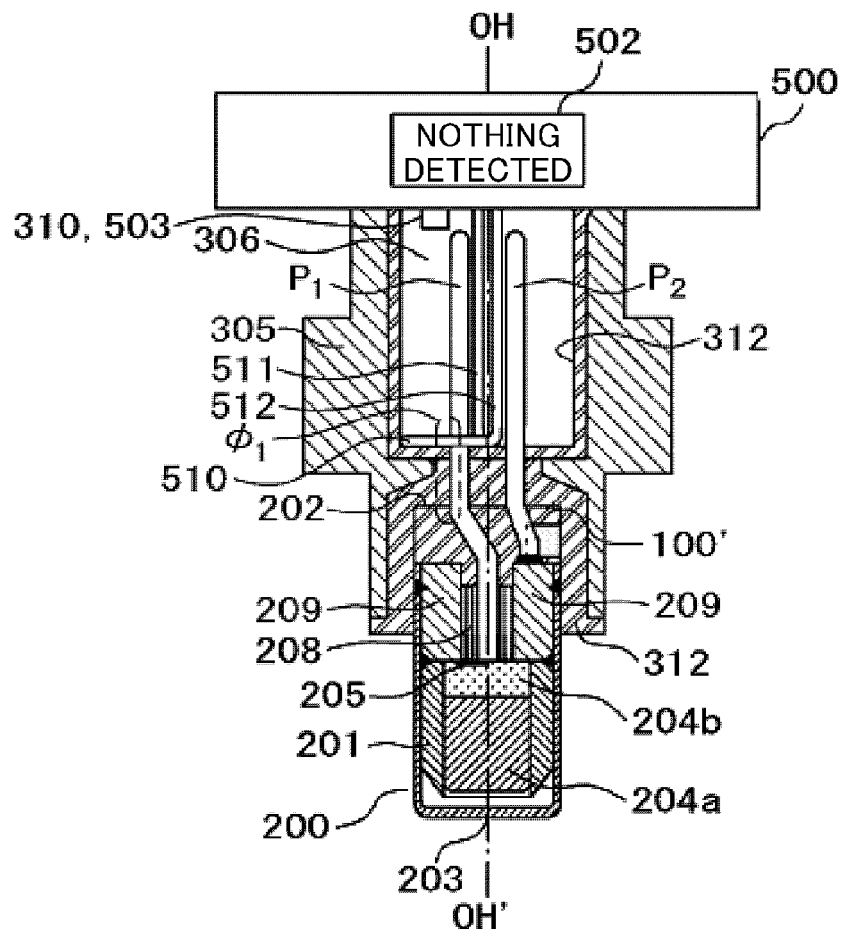
FIG. 8B is a diagram showing a state where the first conductive pin P1 and the second conductive pin P2 of the igniter are inserted in reverse positions.
Figure 8C:
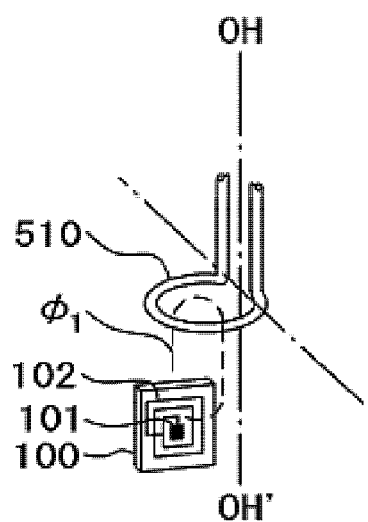
FIG. 8C is a diagram showing the coupling relationship between a detection portion of the IC tag communication reader/writer and a primary coil and a secondary coil of the IC tag in the state of FIG. 8A.

FIGS. 8A, 8B, and 8C each illustrate a configuration for detecting, in a contactless manner, the states of the first conductive pin P1 and the second conductive pin P2 of the igniter 200 with the IC tag 100 embedded therein.

FIG. 8A shows a state where the IC tag 100 is embedded in the vicinity of the second conductive pin P2 and the first conductive pin P1 and the second conductive pin P2 of the igniter 200 are normally inserted. Φ1 represents magnetic flux lines of electromagnetic induction and show a state of mutual induction between the coil antenna 102 of the IC tag and the coil of the detection portion 510. The fitting portion 503 of the IC tag communication reader/writer 500 is in one-on-one correspondence to the positioning portion (recessed/protruding structure) 310 of the gas generator 300. A region from the internal high-frequency antenna circuit of the IC tag communication reader/writer 500 to the signal transmission portions 511, 512 is defined as a series of detection devices. Only when the fitting portion has the predetermined depth H and the IC tag communication reader/writer 500 is fitted therein, the loop antenna of the detection portion 510 thereof is brought close to the coil 102 of the IC tag 100 located just therebelow in the shortest distance and the detection portion 510 and the IC tag are fixed at positions within a predetermined distance. In this state, the detection portion 510 and the IC tag are electromagnetically coupled by the magnetic flux Φ1. That is, a detectable condition is established.

If the conductive pins are correctly inserted, the detection portion 510 is electromagnetically coupled to the loop surface of the IC tag 100, thereby allowing the external communication through the signal transmission portions 511 and 512 by the internal high-frequency antenna circuit of the IC tag communication reader/writer 500, or the like.

FIG. 8C is a diagram illustrating the coupling relationship by mutual induction in the loop of the magnetic flux line Φ1 between the coil of the detection portion 510 and the coil antenna 102 of the IC tag in FIG. 8A. In the figure, the pins P1 and P2, resin and the like, which are irrelevant to the coupling, are not shown. It should be noted that the plurality of magnetic flux lines Φ1 pass through the primary coil surface and the secondary coil surface, but are represented by a single dotted loop. The magnetic flux line Φ1 heading in a direction outwardly from the coil surface of the detection portion 510, which serves as a primary coil, passes through the coil antenna 102 of the IC tag, which is equivalent to a secondary coil, to the opposite side thereof, and returns therefrom through the inside of the coil surface of the detection portion 510 in such a manner as to make the shape of a loop, thereby forming a closed loop. That is, the relation between the two coil surfaces bundled together by the common magnetic flux line passing therethrough is referred to as the mutual induction.

In this manner, a mutual inductive relation equivalent to the relation between a primary coil and a secondary coil of a transformer is established between the coil of the IC tag and the minute loop of the detection portion 510. Assuming that a high-frequency current of the signal transmission portion is the primary current, the magnetic flux line induced by the primary current induces the secondary current in the coil antenna of the IC tag. The IC tag 100 energized by the secondary current returns signals indicative of identification information, such as an ID number thereof, and other specific information to the internal high-frequency antenna circuit by inversely following the signal transmission portions. The sensitivity of the IC tag communication reader/writer 500 increases with a decrease in the distance between the signal transmission portion and the tag 100. Therefore, when the fitting portion 503 fits the positioning portion 310 of the igniter 200, such as a recessed/protruding structure or mark, the detection portion 510 detects the IC tag 100 directly thereunder and in the immediate vicinity thereof. The detection result is displayed on the display portion 502 of the IC tag communication reader/writer 500.

If the first conductive pin P1 and the second conductive pin P2 are erroneously inserted in the igniter assembly, the IC tag is deviated from the predetermined position. FIG. 8B illustrates a case where the IC tag 100' is embedded in the vicinity of the second conductive pin P2 and the first conductive pin P1 and the second conductive pin P2 of the igniter 200 are reversely inserted. In this case, since the IC tag 100' is outside a range detectable by the magnetic flux line Φ1' of the detection portion 510, the IC tag communication reader/writer 500 cannot detect the IC tag 100'. Since nothing is displayed on the display portion 502 of the IC tag communication reader/writer 500, the state shown in FIG. 8B is determined that the conductive pins are erroneously inserted or that the IC tag is absent.

As described above, if the igniter 200 with the IC tag installed therein is mistakenly rotated through 180° and in consequence, the first conductive pin P1 and the second conductive pin P2 are reversely inserted in the igniter assembly and integrated, the position of the IC tag is deviated to the opposite side with respect to the fitting portion 503. In the state shown in FIG. 8B, the detective electromagnetic wave output and the like are adjusted in advance so that the width of this deviation corresponds to an electromagnetic distance that disables the detection by the detection portion D.

Figure 9A:
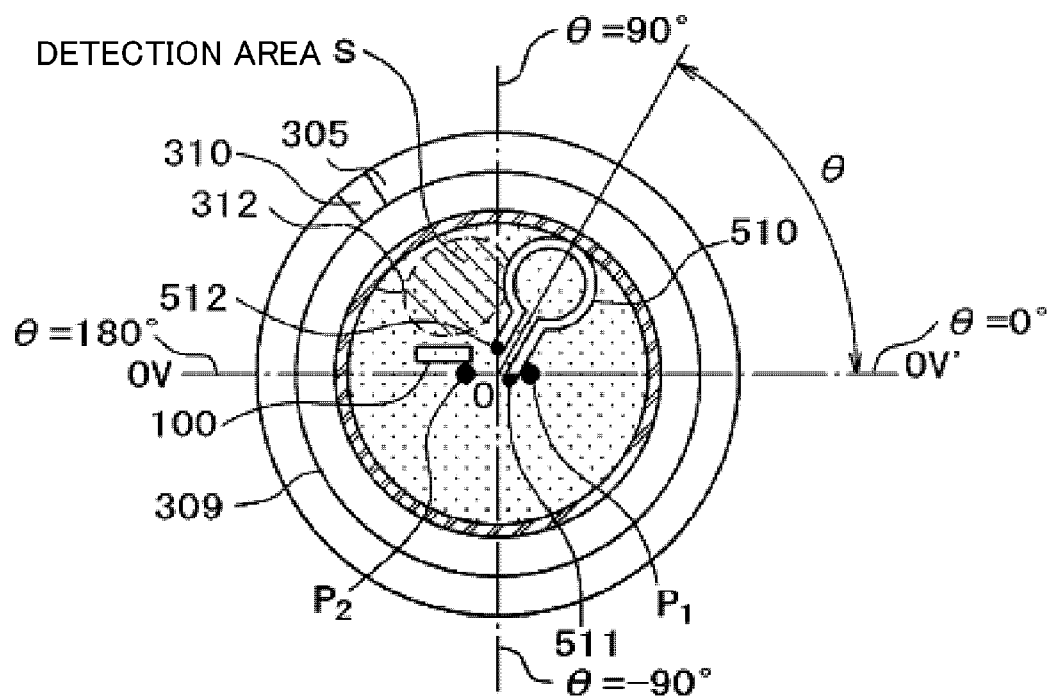
FIG. 9A is a plan view showing a positional relation of the detection portion of the IC tag communication reader/writer in a connector insertion space of an igniter collar.
Figure 9B:
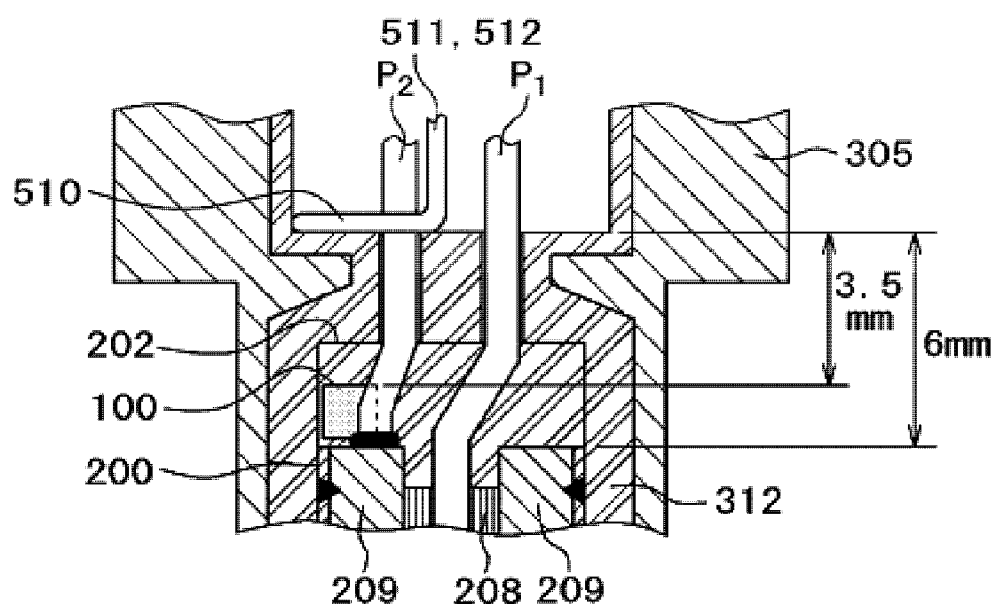
FIG. 9B is a vertical sectional view showing an example of the positional relation between the detection portion and the IC tag in the igniter.

The inventors experimented to determine whether or not the IC tag communication reader/writer 500 could detect the IC tag of the igniter assembly according to this embodiment. The results will be described with reference to FIG. 9A and FIG. 9B. FIG. 9A is a plan view showing a positional relation of the detection portion 510 of the IC tag communication reader/writer 500 in the connector insertion space 306 of the igniter collar 305. FIG. 9B is a vertical sectional view showing an example of the positional relation between the detection portion 510 and the IC tag in the igniter 200.

The experiment was performed as follows. Within the connector insertion space 306, the detective electromagnetic wave output from the IC tag communication reader/writer 500 was set to 25 dBm (920 MHz) and the position (rotational angle θ) of the detection portion 510 was rotationally shifted from P1. It should be noted that, when the detection portion is positioned directly above the IC tag (θ=180°), the distance between the detection portion 510 and the metal eyelet 209 is set to 6 mm, and the upper side of the IC tag 100 is perpendicularly raised by the length of the one side, namely, 2.5 mm, above the top surface 2090 of the eyelet. At this time, the shortest distance between the detection portion 510 and the IC tag 100 is 3.5 mm.

The detection portion 510 has a coil diameter of 5 mm, and the IC tag is IM5-PK2525 tag of Hitachi Chemical Co., Ltd., which has a 2.5 mm square coil. With a rotational angle θ (angle to OV-OV') of 90° to 135°, the IC tag 100 could be reliably detected by the detection portion 510. In FIG. 9A, the region where the IC tag 100 was detected is shown as detection area S.

In a region with a rotational angle θ of −90° or −135° between 0° and 180°, on the other hand, the IC tag 100 could not be detected. This detection experiment example showed that the detection portion 510 could reliably detect the IC tag 100 in a predetermined position and with a resolution within a dimensional range of the detection coil. That is, it is possible to easily detect a wrong assembly in which the igniter 200 is erroneously inserted in the igniter collar 305 by reversing the positions of P1 and P2.

According to the embodiment, the IC tag is disposed inside the insulating layer of the igniter assembly. Thus, in the event that any failure is detected in a completed igniter assembly, the information can be obtained from the IC tag, whereby the cause of the failure can be analyzed or the range of the failure can be determined.

Furthermore, according to the embodiment, the IC tag is embedded in the igniter assembly having the igniter collar, serving as a metallic shield and the space for connector connection in the igniter collar is put to use for detecting the IC tag. Thus, even after the igniter assembly is mounted in the vehicle body, the IC tag information corresponding to each igniter can be efficiently detected from outside by the IC tag communication reader/writer 500 or the like without affecting the characteristics of the igniter assembly. Further, the reversed insertion of the conductive pins of the ignition circuit can be efficiently externally detected from a single unit of completed igniter assembly without affecting the characteristics of the electric components thereof, such as the bridge wire 205 and the ignition charge 204.

It should be noted that the IC tag communication reader/writer 500 does not need to have an integral structure. For example, the individual components of the reader/writer, such as the signal transmission portion 511 to the IC tag, may be separately formed and interconnected with cables or electromagnetically, wirelessly interconnected. In this case, although not shown in the figure, the IC tag communication reader/writer 500 has: a main body having an IC tag communication reader/writer antenna; and a dipole antenna provided independent from the main body and having the signal transmission portion and the detection portion. The same electromagnetic wave as the electromagnetic wave for IC tag communication is used for communication between the main body and the dipole antenna. The portion supporting the dipole antenna is provided with a positioning portion, made of resin or the like, which corresponds to the recessed/protruding structure of the igniter 200.

According to an assembly method for the gas generator 300 adopting this embodiment, the igniter assembly is mounted to the gas generator 300 after the acquisition of the specific identification information, such as ID number, specific to the igniter as well as the determination of the positional relation of the first conductive pin P1 and the second conductive pin P2 in the igniter assembly. After the determination is thus made on whether or not the insertion of the two conductive pins in the gas generator is correct, the igniter assembly is incorporated in the gas generator, and further, the gas generator is incorporated in the airbag device, and then the airbag device is installed in the vehicle. Using the determination method according to this embodiment, the determination about the two conductive pins included in the igniter assembly can be easily performed at a lower cost than before. Therefore, even in the assembly of automobile safety devices, such as an airbag device (gas generator for airbags) and seatbelt pretensioner, the assembly can be performed such that the two conductive pins match their respective ignition power electrodes without reversing the two conductive pins, thereby also improving the reliability on the devices. It should be noted that the determination method according to the present invention is also applicable to an igniter and an igniter assembly which have three or more conductive pins.

Fourth Embodiment

Next, a fourth embodiment of the present invention will be described.

The positioning portion of the igniter assembly according to the present invention is not limited to the mechanical structure designed to secure the positional relation. The fourth embodiment adopts an optical detecting mechanism.

Means for fixing the relative positional relation between the igniter assembly and the IC tag communication reader/writer is not limited to the mechanical structure. The structure may be replaced by an optical detection structure, for example, in which a detection mark as the positioning portion for the IC tag communication reader/writer is provided to the surface of the flange 309 shown in FIG. 1B, and the detection mark is detected by a camera provided to the IC tag communication reader/writer, and the image of the detection mark is subjected to image processing to confirm the relative positional relation.

For example, a detection mark, as the positioning portion for the IC tag communication reader/writer, is provided to the surface of the flange 309 of the igniter assembly. Then the reader/writer or the igniter assembly is placed on a table or robot arm movable on XY coordinates, and the detection mark of the positioning portion is detected by the camera provided to the IC tag communication reader/writer. The image of the mark is subjected to image processing to confirm the relative positional relation between the igniter assembly and the reader/writer. After the accurate positioning of the reader/writer and the igniter assembly, the reversed insertion detection is performed in the same manner as the first embodiment.

According to this embodiment, the IC tag is embedded in the igniter assembly at the predetermined position, thereby allowing efficient detection of the reversed insertion of the conductive pins in a contactless manner from outside without affecting the characteristics of the igniter assembly.

Fifth Embodiment

Next, a fifth embodiment of the present invention will be described.

Description will now be made on a method for communication with the IC tag from outside the steering wheel using the hand-held IC tag communication reader/writer 500 after the airbag device including the igniter assembly according to any one of the first to fourth embodiments of the present invention is incorporated in the interior of the steering wheel of a automotive body or the like, and mounted in the vehicle by wiring the gas generator 300 and the signal cable 470 connected thereto.

As described above, in the IC tag communication reader/writer 500 for airbag systems, the UHF-band radio wave is commonly used as a high-power and long-reach radio wave for the IC tag. However, the IC tag 100 is incorporated in the interior of the igniter collar (metallic shield vessel) 305 of the gas generator 300. More specifically, the structure is such that the radio wave for externally directly communicating with the IC tag 100 is prevented from entering the inside of the gas generator 300. Therefore, the manufacturing information on the IC tag cannot be externally directly obtained by the IC tag communication reader/writer.

Meanwhile, according to the present invention, as shown in FIGS. 4 and 5B, the signal cable 470 is connected to the gas generator 300 of the airbag device 484 through the connector 460. In this case, the IC tag 100 is disposed adjacent to the base of the conductive pin (P2 or P1) in the igniter 200. Furthermore, the conductive pin is connected to the corresponding signal cable extending to the outside of the gas generator 300. It is important that one or more signal cables are connected to the conductive pin immediately adjacent to the IC tag 100 and have a length of at least 20 cm or more.

Figure 10:
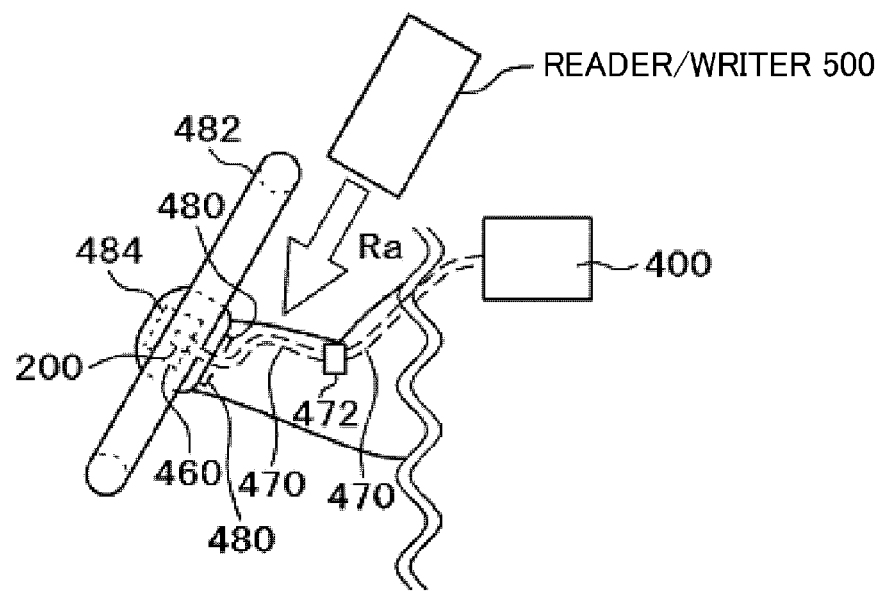
FIG. 10 is a diagram showing a state where manufacturing information on the IC tag is read by the IC tag communication reader/writer 500 in the vicinity of the automotive driver's seat equipped with the airbag system.

FIG. 10 is a diagram showing a state where manufacturing information on the IC tag is read by the IC tag communication reader/writer 500 in the vicinity of the automotive driver's seat equipped with the airbag device. The current supply circuit (ECU) 400 and the connector 460 of the squibs of the airbag device 484 are connected by the signal cable 470 having a length of 20 cm or more and the coupler 472.

It should be noted that the arrangements of the gas generator 300 and the igniter 200 in a passenger seat, backseat or the like are also the same as in the high-frequency equivalent circuit, and hence are not shown here but represented by the figure around the steering wheel.

The signal cable 470 in the vicinity of the driver's seat includes a portion covered with the metallic material, which forms the steering wheel 480 and the vehicle body, and a portion covered only with a nonmetallic material rather than with the metallic material. In the reader/writer 500, the manufacturing information on the IC tag is read using a radiated wave Ra by utilizing the portion of the signal cable 470 which is not covered with the metallic material.

Figure 11A:
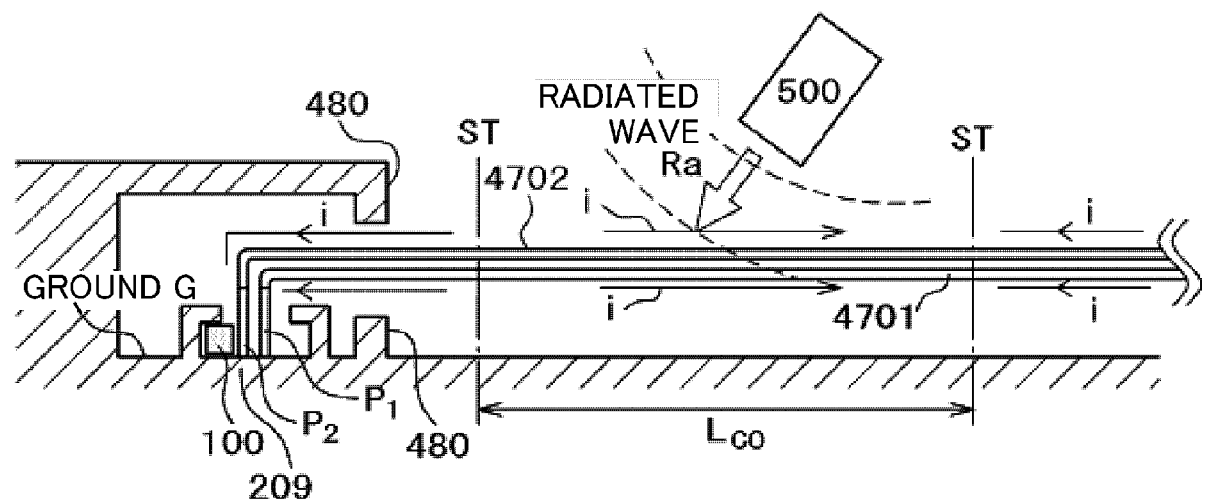
FIG. 11A is a diagram for illustrating a method for reading the manufacturing information on the IC tag using the IC tag communication reader/writer in the vicinity of the automotive driver's seat.
Figure 11B:
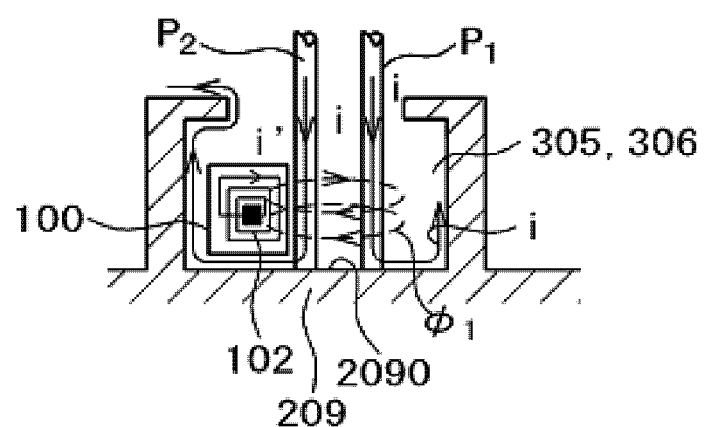
FIG. 11B is an enlarged view for illustrating the operation in the vicinity of the IC tag as shown in FIG. 11A.

FIGS. 11A and 11B are a simplified schematic diagram using a high-frequency equivalent circuit, illustrating a method for reading the manufacturing information on the IC tag 100 using the IC tag communication reader/writer 500 in the vicinity of the automotive driver's seat. The signal cable 470 is insulated in terms of direct current from the metal eyelet 209, a metallic portion of the steering wheel 480, and a metallic box portion of the vehicle body by the insulating material, such as resin. However, in the high-frequency equivalent circuit, the insulating material is capacitively coupled to the ground electromagnetically, and therefore those have the same ground level.

As shown in FIG. 11A, the UHF-band radiated wave Ra from the IC tag communication reader/writer 500 strikes the signal cables 470 (4701 and 4702) and induces a high-frequency current i flowing in the same phase (same direction) on these signal cables. Further, the high-frequency current interferes with a reflective current generated by the bending of the connector or signal line or the like and forms a standing wave with a periodic size. In FIG. 11A, the state of generation of the standing wave of the current is simplistically shown as an equivalent circuit diagram of the high-frequency circuit. It should be noted that, when the minimal portion of the standing wave is defined as a node ST, the internode distance Lco is a half wavelength, and the midpoint between the two nodes is the antinode where the standing wave of the current becomes maximum. In addition, in the equivalent circuit diagram, the eyelet 209, the steering wheel 480, and the metallic elements of the vehicle body is set as the earth side or the ground G side in order to clearly show the state where the structure of the portion incorporating the IC tag 100 is surrounded by the ground G.

FIG. 11B is an enlarged view of the vicinity of the IC tag shown in FIG. 11A, which shows that the high-frequency current i passing through the second conductive pin (P2) of the igniter generates the magnetic flux line Φ1 and induces a high-frequency current i' as a mutually-induced current in the coil antenna 102 located inside the IC tag 100, thereby operating the IC tag 100. That is, even without the detection portion 510, such as shown in FIG. 6, when the standing wave current i is applied to the signal cable 470 from a distance by the radiated wave Ra of the IC tag communication reader/writer 500, the IC tag 100 is operated by the high-frequency current i' as a mutually-induced current even if the IC tag 100 is shielded by the igniter collar 305 or the connector insertion space 306.

It is important that the IC tag 100 should be placed parallel and close to the conductive pin P2 and at an angle perpendicular or nearly perpendicular to the surface (first end face) 2090 of the eyelet 209 opposite the ignition charge. This arrangement causes the eyelet to serve as the ground side G, resulting in an increase in magnetic flux, that is, an increase in the coupling density of the mutual induction caused by the high-frequency current i and the high-frequency current i'.

If there is a signal cable longer than the wavelength of the radiated wave radiated by the IC tag communication reader/writer 500, at least one or more standing waves are generated in the signal cable. For example, in the case of a radio wave with a frequency of 920 MHz in the UHF band, the internode distance Lco becomes approximately 16 cm, and at least one or more standing waves are generated in the signal cable having a length of 20 cm or more, so that the IC tag 100 is operated by the mutually-induced current corresponding to the high-frequency current i. Even if the signal cable is partially surrounded by a metallic material, the IC tag 100 can be operated by the high-frequency current i as long as the overall length is 20 cm or more and the length of the signal cable which is exposed outside the metallic material is at least 8 cm or more. In the reader/writer 500, the standing wave becomes a periodic wave that decreases due to a variety of losses with distance from a radiation point.

It should be noted that the magnitude of the high-frequency current i is of the order of μA, which is a considerably smaller value than a current required for operating the squib of the igniter 200, for example, a current on the order of 120 mA to 1 A. Therefore, there is no possibility that the high-frequency current i triggers the igniter 200 incorporated in the automobile, resulting in improper operation of the airbag.

The inventors have obtained an experimental result that, when an output of 30 dBm (920 MHz, 1 W) is emitted as the UHF-band radiation wave Ra from the reader/writer 500, the noncontact distance between the signal cable and the reader/writer is 6 cm, or 10 cm at a point where the standing wave is large. Furthermore, at this time, the length of the signal cable from the IC tag 100 to the point where the radiation wave Ra is radiated is within 20 cm.

From the above, according to the present invention, if the igniter 200 and the gas generator 300 are at the parts level in which they have not yet been connected to the signal line, as described in the third embodiment, it can be inspected by the detection unit 510 in component inspection whether or not the conductive pins (P1 and P2) are assembled in the proper position.

Furthermore, even after the igniter 200 and the gas generator 300 are incorporated in an automobile as an airbag device, the IC tag information can be detected from the outside, such as the steering wheel. This eliminates the need for the work of disassembling the steering wheel, removing the signal cable and connector connected to the igniter 200 of the gas generator 300, and inserting the detection portion 510 into the connector insertion space 306, after the igniter 200 and the gas generator 300 are incorporated into the automobile as the airbag device. Consequently, the recall inspection of the airbag device or the like is drastically reduced in cost, which can contribute to rapid safety inspections.

In the above-described embodiments, the case where the IC tag 100 is installed in the base of the second conductive pin P2 has been described. However, in some practices of the present invention, for convenience of process, the base of the first conductive pin P1 may be a suitable place for the installation or there may be only the first conductive pin P1. In each case, as for the signal cable connected to the outside, the mutual induction and electromagnetic effects of the standing wave current i passing through the signal cable are the same as those in the foregoing embodiments. Therefore, it goes without saying that similar effective advantages can be obtained even if the installation position of the IC tag 100 is changed to the first conductive pin P1 side.

In addition, although the automotive airbag device has been used as an application example of the embodiments, the present invention is also applicable to devices other than the airbag device as long as the configuration is such that the igniter assembly length Lb is a short length of about 20 mm or less and the signal cable extends to the outside of the ignition assembly.

LIST OF REFERENCE SIGNS

100: IC tag
101: IC chip
102: Coil antenna
200: Igniter
201: Charge holder
202: Header
203: Metal cover
204: Ignition charge (ignition agent)
205: Bridge wire
206: First conductive pin (P1)
207: Second conductive pin (P2)
209: Eyelet
300: Gas generator
301: Transfer charge
302: Gas generating agent mold
303: Gas exhaust
305: Igniter collar (metallic shield vessel)
306: Connector insertion space
309: Annular flange for igniter collar
310: Positioning portion
311: Resin
312: Resin
315: Hole
316: Hole
400: Current supply circuit (ECU)
401: Connection portion with connector
402: Connection portion with connector
460: Connector
470: Signal cable
472: Coupler
480: Steering wheel
482: Steering wheel ring
484: Airbag device
500: IC tag communication reader/writer
503: Fitting portion
510: Detection portion
H: Predetermined depth
2066: Electrode for fitting first conductive pin
2077: Electrode for fitting second conductive pin
2090: Top surface of eyelet (first end face)
4701: Signal cable (L1)
4702: Signal cable (L2)

The invention claimed is:

1. An igniter assembly for which an igniter and a conductive igniter collar retaining the igniter therein are integrated with an insulating layer interposed therebetween, the igniter comprising:
a metal eyelet partially covered with the insulating layer;
a metal cover that retains the eyelet therein;
an ignition charge disposed in a space in contact with one end face of the eyelet within the cover;
a heating element connected to the one end face of the eyelet; and
at least one conductive pin electrically connected to the heating element,
wherein one end of the conductive pin is exposed from the insulating layer so that a current supply circuit for supplying an ignition current to the heating element is connected thereto from outside the igniter collar;
an IC tag is disposed adjacent to the conductive pin within the insulating layer;
the IC tag has an IC chip and a coil antenna wound around the IC chip;
the igniter assembly has a length shorter than ¼ of a radio wavelength λ used in a reader/writer for the IC tag; and
the IC tag is disposed in the vicinity of the other end face of the eyelet opposite the one end face, at a perpendicular or nearly perpendicular angle and so that a surface of the coil antenna becomes parallel or nearly parallel to the conductive pin.

2. The igniter assembly according to claim 1,
wherein the IC tag is of a tabular shape;
the eyelet is of a hollow columnar shape; and the tabular IC tag has one side disposed on the other end face of the eyelet and is embedded in the insulating layer.

3. The igniter assembly according to claim 2,
wherein the coil antenna of the IC tag is a planar coil;
the one end of the conductive pin is led out from the igniter assembly by at least one signal cable so as to be connectable to the current supply circuit; and
the IC tag is disposed in a positional relation with respect to the conductive pin such that the IC tag is operated by a mutually-induced current that a magnetic flux line generated by a high-frequency current supplied to the conductive pin through the signal cable induces in the coil antenna wound around the IC chip.

4. The igniter assembly according to claim 3, wherein the conductive pin has:
a first conductive pin that passes through a hollow portion of the eyelet and is electrically connected to the heating element on the one end face of the eyelet; and
a second conductive pin that is electrically connected to the other end face of the eyelet, and
the IC tag is disposed perpendicularly on the other end face of the eyelet and embedded in the insulating layer along the second conductive pin.

5. The igniter assembly according to claim 3,
wherein the igniter assembly has a longitudinal length Lb of 20 mm or less; and
the one end of the conductive pin extends to a connection space for a current supply component in the igniter collar.

6. The igniter assembly according to claim 5,
wherein the igniter is an igniter for instantaneously activating an occupant restraint system for a vehicle;
the igniter collar and the signal cable are incorporated and installed in a vehicle body or steering wheel; and
the signal cable between the current supply circuit and a connector connecting the signal cable to the conductive pin has a length Lc of at least 20 cm.

7. An airbag device comprising a gas generator, an igniter assembly, and a current supply circuit,
the igniter assembly having a configuration in which an igniter and a conductive igniter collar retaining the igniter therein are integrated with an insulating layer interposed therebetween, wherein the igniter includes:
a metal eyelet partially covered with the insulating layer;
a metal cover that retains the eyelet therein;
an ignition charge disposed in a space in contact with one end face of the eyelet within the cover;
a heating element connected to the one end face of the eyelet; and
at least one conductive pin that passes through the insulating layer and is electrically connected to the heating element,
wherein one end of the conductive pin is exposed from the insulating layer so that the current supply circuit for supplying an ignition current to the heating element is connected thereto from outside the igniter collar;
an IC tag is disposed adjacent to the conductive pin within the insulating layer;
the IC tag has an IC chip and a coil antenna wound around the IC chip;
the igniter assembly has a length shorter than ¼ of a radio wavelength λ used in a reader/writer for the IC tag;
the IC tag is disposed in the vicinity of the other end face of the eyelet opposite the one end face, at a perpendicular or nearly perpendicular angle and so that a surface of the coil antenna becomes parallel or nearly parallel to the conductive pin; and
the one end of the conductive pin is led out from the igniter assembly by at least one signal cable so as to be connectable to the current supply circuit.

8. The airbag device according to claim 7,
wherein the igniter collar and the signal cable are incorporated and installed in a vehicle body or steering wheel; and
in the signal cable, a standing wave is generated by a radiated wave radiated by the reader/writer for IC tag communication, and a mutually-induced current is induced in the coil antenna located inside the IC tag by the standing wave, thereby operating the IC tag.

9. The airbag device according to claim 8,
wherein the signal cable between the current supply circuit and a connector connecting the signal cable to the conductive pin has a length Lc of at least 20 cm; and
the IC tag is disposed in a positional relation with respect to the conductive pin such that the IC tag is operated by the mutually-induced current that a magnetic flux line generated by a high-frequency current supplied to the conductive pin through the signal cable induces in the coil antenna wound around the IC chip.

10. A detection system for an igniter assembly using an IC tag communication reader/writer,
the igniter assembly comprising:
an igniter collar; and
an igniter fixed to the igniter collar with an insulating layer interposed therebetween,
the igniter including:
a metal eyelet partially covered with the insulating layer;
a metal cover that retains the eyelet therein;
an ignition charge disposed in a space in contact with one end face of the eyelet within the cover;
a heating element connected to the one end face of the eyelet; and
at least one conductive pin that passes through the insulating layer and is electrically connected to the heating element,
wherein one end of the conductive pin is exposed from the insulating layer so that a current supply circuit for supplying an ignition current to the heating element is connected thereto from outside the igniter collar;
an IC tag is disposed adjacent to the conductive pin within the insulating layer;
the IC tag has an IC chip and a coil antenna wound around the IC chip;
the igniter assembly has a length shorter than ¼ of a radio wavelength λ used in the IC tag reader/writer for the IC tag;
the IC tag is disposed in the vicinity of the other end face of the eyelet opposite the one end face, at a perpendicular or nearly perpendicular angle and so that a surface of the coil antenna becomes parallel or nearly parallel to the conductive pin; and
a standing wave is generated in a signal cable by a radiated wave radiated by the IC tag communication reader/writer, and a mutually-induced current is induced in the coil antenna located inside the IC tag by the standing wave, thereby operating the IC tag.

11. The detection system for the igniter assembly according to claim 10,
wherein the one end of the conductive pin extends to a connection space for a current supply component in the igniter collar;

the connection space is configured to be used as a window through which the IC tag communication reader/writer detects the IC tag;

the igniter collar is provided with a positioning portion for the IC tag communication reader/writer, the positioning portion corresponding to the position of the IC tag;

the IC tag communication reader/writer is provided with a detection portion;

a fitting portion of the IC tag communication reader/writer is fitted in the positioning portion of the igniter collar, thereby causing mutual induction between a coil portion of the detection portion and a coil of the IC tag;

the detection portion and the IC tag are electromagnetically coupled by magnetic flux when the detection portion and the IC tag are fixed within a predetermined distance therebetween; and the detection portion and the IC tag are outside a range detectable by magnetic flux when the detection portion and the IC tag are fixed outside the predetermined distance therebetween.

12. A detection method for an igniter assembly using an IC tag communication reader/writer, the igniter assembly comprising:

an igniter collar having a positioning portion; and an igniter fixed in the igniter collar with an insulating layer interposed therebetween, the igniter including:

a metal eyelet partially covered with the insulating layer;

a metal cover that retains the eyelet therein;

an ignition charge disposed in a space in contact with one end face of the eyelet within the cover;

a heating element connected to the one end face of the eyelet; and at least one conductive pin that passes through the insulating layer and is electrically connected to the heating element, wherein one end of the conductive pin is exposed from the insulating layer so that a current supply circuit for supplying an ignition current to the heating element is connected thereto from outside the igniter collar;

an IC tag is disposed adjacent to the conductive pin within the insulating layer;

the IC tag has an IC chip and a coil antenna wound around the IC chip;

the igniter assembly has a length shorter than ¼ of a radio wavelength $\lambda$ used in the reader/writer for the IC tag;

the IC tag is disposed in the vicinity of the other end face of the eyelet opposite the one end face, at a perpendicular or nearly perpendicular angle and so that a surface of the coil antenna becomes parallel or nearly parallel to the conductive pin;

the one end of the conductive pin is led out from the igniter assembly by at least one signal cable so as to be connectable to the current supply circuit; and in the signal cable, a standing wave is generated by a radiation wave radiated by the IC tag communication reader/writer, and a mutually-induced current is induced in the coil antenna inside the IC tag by the standing wave, thereby operating the IC tag.

13. The igniter assembly detection method according to claim 12, wherein the signal cable between the current supply circuit and a connector connecting the signal cable to the conductive pin has a length Lc of at least 20 cm.

14. The igniter assembly detection method according to claim 13, wherein the igniter assembly has a longitudinal length Lb of 20 mm or less;

the one end of the conductive pin extends to a connection space for the signal cable in the igniter collar;

the connection space is used as a window through which the IC tag communication reader/writer detects the IC tag;

the IC tag communication reader/writer is set to the positioning portion of the igniter collar;

when electromagnetic coupling by magnetic flux between a detection portion and the IC tag is detected, it is determined that a pair of conductive pins are connected to the igniter at normal positions; and when the electromagnetic coupling by magnetic flux between the detection portion and the IC tag cannot be detected, it is determined that the pair of conductive pins are not connected to the igniter at normal positions.

15. The igniter assembly detection method according to claim 14, the IC tag has a surface of the coil antenna parallel to the conductive pin; and the IC tag is operated by inducing a secondary current in the coil antenna from a primary high-frequency current of the detection portion and performs IC tag communication with the IC tag communication reader/writer by inducing information on the IC tag inversely from the secondary current to the primary current.

* * * * *